United States Patent
Muller et al.

(10) Patent No.: US 12,457,530 B2
(45) Date of Patent: Oct. 28, 2025

(54) INTER-SYSTEM HANDOVER INVOLVING E1 INTERFACE

(71) Applicant: Telefonaktiebolaget LM Ericsson (publ), Stockholm (SE)

(72) Inventors: Julien Muller, Rennes (FR); Alexander Vesely, Feldbach (AU); Anders Hallberg, Vreta Kloster (SE); Stefan Eng, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 384 days.

(21) Appl. No.: 18/250,099

(22) PCT Filed: Oct. 21, 2021

(86) PCT No.: PCT/IB2021/059730
§ 371 (c)(1),
(2) Date: Apr. 21, 2023

(87) PCT Pub. No.: WO2022/084920
PCT Pub. Date: Apr. 28, 2022

(65) Prior Publication Data
US 2023/0397055 A1    Dec. 7, 2023

Related U.S. Application Data

(60) Provisional application No. 63/094,755, filed on Oct. 21, 2020.

(51) Int. Cl.
*H04W 36/00* (2009.01)
*H04W 36/14* (2009.01)

(52) U.S. Cl.
CPC ....... *H04W 36/0022* (2013.01); *H04W 36/14* (2013.01)

(58) Field of Classification Search
CPC .. H04W 36/0022; H04W 36/14; H04W 92/20
(Continued)

(56) References Cited

U.S. PATENT DOCUMENTS

| 2020/0077317 A1* | 3/2020 | Sharma | H04W 28/24 |
| 2020/0367109 A1* | 11/2020 | Chen | H04W 28/18 |
| 2021/0377818 A1* | 12/2021 | Xu | H04W 36/0033 |

OTHER PUBLICATIONS

International Search Report and Written Opinion dated Jan. 31, 2022 issued in PCT Application No. PCT/IB2021/059730 filed Oct. 21, 2021, consisting of 15 pages.

(Continued)

*Primary Examiner* — Michael Y Mapa
(74) *Attorney, Agent, or Firm* — Sonoda & Kobayashi Intellectual Property Law; Sarvajit S. Patil

(57) ABSTRACT

A method, system and apparatus are disclosed. According to one or more embodiments, a network node including a target central unit, CU, the target CU including a CU-CP, and a CU-UP, that are in communication with each other via at least one interface is provided. The network node configured to identify a handover request associated with an inter-system handover, determine a configuration for the CU-UP to one of add and omit a service data adaptation protocol, SDAP, header for at least one inter-system data packet that is to be transmitted to a wireless device and cause transmission of at least one message over the interface where the at least one message configured to initiate a bearer context procedure, indicate that the bearer context procedure is associated with the inter-system handover, and indicate the configuration of the CU-UP.

30 Claims, 12 Drawing Sheets

(58) Field of Classification Search
USPC .............. 370/331; 455/436–444, 450–452.1
See application file for complete search history.

(56) References Cited

OTHER PUBLICATIONS

3GPP TSG-RAN WG3 Meeting #109-e R3-205102; Source: CATT, Nokia, Nokia Shanghai Bell, China Telecom, ZTE; Title: Discussion on E1AP for Inter-System Direct Data Forwarding; Agenda Item: 31.3.3; Document for: Discussion and Decision; Online Aug. 17-27, 2020, consisting of 6 pages.
3GPP TSG-RAN WG3 #112e R3-211825; Source: CATT, China Telecom, ZTE; Title: Support of Direct Data Forwarding for Inter-System Handover w/o Shared gNB; Document for: Approval; May 17-28, 2021, consisting of 5 pages.
3GPP TSG-RAN WG3 Meeting #110e R3-206620 Change Request 38.463 CR 0538 rev 1 Current Version: 16.3.0; Title: Inter-System Direct Data Forwarding and E1; Source to WG: Ericsson: Source to TSG: R3; Work Item Code: Direct_data_fw_NR-Core; Online Nov. 2-12, 2020, consisting of 32 pages.
3GPP TSG-RAN WG3 Meeting #109e R3-205383 Change Request 38.463 CR 0550 rev Current Version: 16.2.0; Title: Support Direct Data Forwarding for Inter-System Handover; Source to WG: Samsung; Source to TSG: RAN3; Work Item Code: Direct_data_fw_NR-Core; Aug. 17-28, 2020, consisting of 11 pages.

3GPP TS 36.300 V16.3.0 (Sep. 2020) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), consisting of 390 pages.
3GPP TS 38.300 V16.3.0 (Sep. 2020) 3rd Generation Partnership Project; Technical Specification Group Radio Access Network; NR; NR and NG-RAN Overall Description; Stage 2 (Release 16), consisting of 148 pages.
3GPP TS 38.401 V16.3.0 (Sep. 2020) 3rd Generation Partnership Project; Technical Specification Group Radio Access Network; NG-RAN; Architecture description (Release 16), consisting of 78 pages.
3GPP TS 38.410 V16.3.0 (Sep. 2020) 3rd Generation Partnership Project; Technical Specification GroupRadio Access Network; NG-RAN; NG general aspects and principles (Release 16), consisting of 17 pages.
3GPP TS 38.413 V16.3.0 (Sep. 2020) 3rd Generation Partnership Project; Technical Specification Group Radio Access Network; NG-RAN; NG Application Protocol (NGAP) (Release 16), consisting of 466 pages.
3GPP TS 38.463 V16.3.0 (Sep. 2020) 3rd Generation Partnership Project; Technical Specification Group Radio Access Network; NG-RAN; E1 Application Protocol (E1AP) (Release 16), consisting of 235 pages.

* cited by examiner

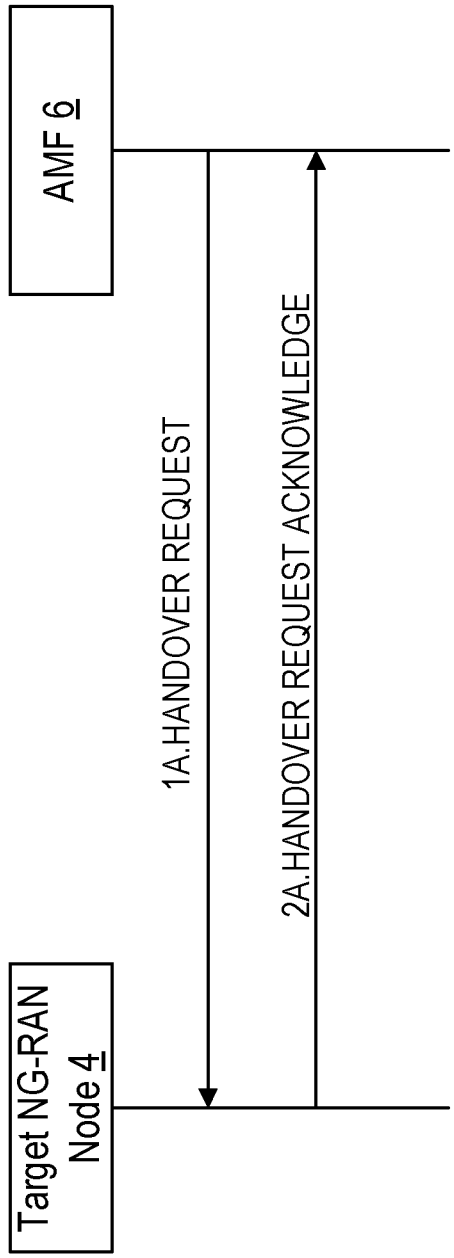

INTER-SYSTEM HANDOVER INVOLVING E1 INTERFACE

CROSS-REFERENCE TO RELATED APPLICATIONS

This application is a Submission Under 35 U.S.C. § 371 for U.S. National Stage Patent Application of International Application No.: PCT/IB2021/059730, filed Oct. 21, 2021 entitled "INTER-SYSTEM HANDOVER INVOLVING E1 INTERFACE," which claims priority to U.S. Provisional Application No. 63/094,755, filed Oct. 21, 2020, entitled "INTER-SYSTEM HANDOVER INVOLVING E1 INTERFACE," the entireties of both of which are incorporated herein by reference.

TECHNICAL FIELD

The present disclosure relates to wireless communications, and in particular, to helping avoid misconfiguration for data forwarding associated with inter-system handover such as, for example, by using an indication that indicates ignore at least one packet data convergence protocol, PDCP, sequence number, SN, associated with a source network node.

BACKGROUND

An Inter-System Handover
General Principles

Connected mode mobility between E-UTRAN and NG-RAN has been introduced in Third Generation Partnership Project (3GPP) Release-15. The following principles were introduced in 3GPP Technical Specification (TS) 36.300 and TS 38.300.

3GPP TS 36.300 generally states the following:
10.2.2b Inter-RAT handovers from E-UTRAN
10.2.2b.1 Data Forwarding
10.2.2b.1.1 for Radio Link Control (RLC)-Acknowledgement Mode (AM) Bearers Upon handover, the network node may forward all downlink PDCP SDUs that have not been acknowledged by the wireless device, or all downlink PDCP SDUs that have not been transmitted to the wireless device, to the target network node. In addition, the network node may forward fresh data arriving over S1 to the target network node.

NOTE: Any assigned packet data convergence protocol (PDCP) sequence numbers (SNs) are not forwarded because of PDCP reset.

NOTE: Target network node does not have to wait for the completion of forwarding from the network node before it begins transmitting packets to the wireless device.

The network node discards any remaining downlink RLC protocol data units (PDUs).

Upon handover, all successfully received PDCP SDUs are delivered to the upper layers in the wireless device.

NOTE: the network node does not need to abort ongoing RLC transmissions with the wireless device as it starts data forwarding to the target network node.

Upon handover, the network node may forward all uplink PDCP SDUs successfully received to the Serving Gateway and discards any remaining uplink RLC PDUs.

Correspondingly, the network node does not forward the downlink and uplink RLC context.

For the uplink, the wireless device transmits over the target RAT from the first PDCP SDU for which transmission has not been attempted in the source cell.

In-sequence delivery of upper layer PDUs during handover is not guaranteed.

10.2.2b.1.2 For RLC-UM Bearers

Upon handover, the network node does not forward to the target network node downlink PDCP SDUs for which transmission had been completed in the source cell.

PDCP SDUs that have not been transmitted may be forwarded. In addition, the network node may forward fresh data arriving over S1 to the target network node. The network node discards any remaining downlink RLC PDUs.

Upon handover, all successfully received PDCP SDUs are delivered to the upper layers in the wireless device.

Upon handover, the network node may forward all uplink PDCP SDUs successfully received to the Serving Gateway and discards any remaining uplink RLC PDUs.

For the uplink, the wireless device transmits over the target radio access technology (RAT) from the first PDCP SDU for which transmission has not been attempted in the source cell. Correspondingly, the network node does not forward the downlink and uplink RLC context.

A portion of 3GPP TS 38.300 describes the following:
9.3.3 NR-E-UTRA mobility: From EPC to 5GC
9.3.4 9.3.3.1 Data Forwarding for the Control Plane
Control plane handling for inter-System data forwarding from Evolved Packet System (EPS) to Fifth Generation (5G) System (5GS) follows the following principles:

1. Only forwarding of downlink data is supported.
2. The target NG-RAN node receives in the Handover Request message the mapping between E-RAB ID(s) and QoS Flow ID(s). The NG-RAN node decides whether to accept the data forwarding for E-RAB IDs proposed for forwarding within the Source NG-RAN Node to Target NG-RAN Node Transparent Container. Based on availability of direct data forwarding path the source network node may request to apply direct data forwarding by indicating direct data forwarding availability to the CN.
3. In case of indirect data forwarding:
   The target NG-RAN node assigns a TEID/TNL address for each PDU session for which at least one QoS flow is involved in the accepted data forwarding.
   The target NG-RAN node sends the Handover Request Acknowledge message in which it indicates the list of PDU sessions and QoS flows for which it has accepted the data forwarding.
   A single data forwarding tunnel is established between the user plane function (UPF) and the target NG-RAN node per PDU session for which at least data for a single QoS Flow is subject to data forwarding.
   The source network node receives in the Handover Command message the list of E-RAB IDs for which the target NG-RAN node has accepted data forwarding of corresponding PDU sessions and QoS flows.
4. In case of direct data forwarding:
   The source network node indicates direct path availability to the CN. The source network node's decision is indicated by the CN to the target NG-RAN node.
   The target NG-RAN node assigns a TEID/TNL address for each E-RAB it accepted for data forwarding.
   The source network node receives in the Handover Command message the list of E-RAB IDs for which the target NG-RAN node has accepted data forwarding.

9.3.3.2 Data Forwarding for the User Plane 9.3.3.3 In case of indirect data forwarding, user plane handling for inter-System data forwarding from EPS to 5GS follows the following principles:

5. For each E-RAB accepted for data forwarding, the source network node forwards data to the SGW in the corresponding E-RAB tunnel and the SGW forwards the received data to the UPF in the E-RAB tunnel.

6. The UPF maps the forwarded data received from an E-RAB tunnel to the corresponding mapped PDU session tunnel, adding a QFI value (by means of the PDU Session User Plane protocol 3GPP TS 38.415).

7. The target NG-RAN node maps a forwarded packet to the corresponding DRB based on the received QFI value. It prioritizes the forwarded packets over the fresh packets for those QoS flows.

8. Handling of end marker packets:

The UPF/PGW-U sends one or several end marker packets to the SGW per EPS bearer. The SGW forwards the received end markers per EPS bearer to the source network node. When there are no more data packets to be forwarded for an E-RAB, the source network node forwards the received end markers in the EPS bearer tunnel to the SGW and the SGW forwards them to the UPF. The UPF adds one QFI (using the PDU Session User Plane protocol 3GPP TS 38.415) among the QoS flows mapped to that E-RAB to the end markers and sends those end markers to the target NG-RAN node in the per PDU session tunnel. When the target NG-RAN node receives an end marker with a QFI added, the target NG-RAN node starts to transmit the data packets of all QoS flows mapped to the corresponding E-RAB received from the core network towards the wireless device.

In case of direct data forwarding, user plane handling for inter-System data forwarding from EPS to 5GS follows the following principles:

9. For each E-RAB accepted for data forwarding, the source network node forwards data to the target NG-RAN node in the corresponding E-RAB data forwarding tunnel.

10. Until a GTP-U end marker packet is received, the target NG-RAN node prioritizes the forwarded packets over the fresh packets for those QoS flows which are involved in the accepted data forwarding.

Inter-System Handover and Direct Data Forwarding

Direct data forwarding for UP packets (i.e., with a direct path from the source network node to the target network node, without Core Network involvement), has been standardized in 3GPP Release 16 (rel-16).

Inter-system data forwarding between EPS and 5GS has to manage interworking between different bearer models is illustrated in FIG. 1. FIG. 1 includes UE 1, eNB 2 and S-GW 3. FIG. 1 is a diagram of a 4G QoS architecture. FIG. 2 is a diagram of a 5G QoS architecture that includes UE 1, NB 4 (e.g., gNB 4, NG-RAN node) and UPF 5. The 5G QoS architecture is as follows:

EPS bearers are 1:1 mapped on Radio Bearers.

5GS PDU sessions and QoS Flows are mapped to Radio Bearers upon the NG-RAN node's decision.

Configuration data in the wireless device and network node decides how to map QoS flows to EPS bearers.

The differences between the indirect and direct data forwarding are illustrated in FIG. 3.

Inter-Node Messages for Mobility Preparation

NG Inter-Node Messages for Handover

According to 3GPP TS 38.410, there is a function called "Mobility Management function" defined as follows:

Mobility Management Function

The mobility function for wireless devices in CM-CONNECTED includes the intra-system handover function to support mobility within NG-RAN and inter-system handover function to support mobility from/to EPS system. It comprises the preparation, execution and completion of handover via the NG interface.

In 3GPP TS 38.413 these functions are described in more details, relevant parts are inserted below:

8.4.2 Handover Resource Allocation 8.4.3 8.4.2.1 General

The purpose of the Handover Resource Allocation procedure is to reserve resources at the target NG-RAN node for the handover of a UE.

8.4.2.2 Successful Operation 8.4.2.3 FIG. 4 is a signaling diagram of an example of a handover resource allocation: successful operation.

The AMF 6 initiates the procedure by sending the HANDOVER REQUEST message to the target NG-RAN node 4 (Step 1A).

If the Masked IMEISV information element (IE) is contained in the HANDOVER REQUEST message, the target NG-RAN node 4, if supported, uses it to determine the characteristics of the wireless device for subsequent handling.

Upon receipt of the HANDOVER REQUEST message the target NG-RAN node 4 attempts to execute the requested PDU session configuration and associated security;

stores the received wireless device Aggregate Maximum Bit Rate in the wireless device context, and use the received wireless device Aggregate Maximum Bit Rate for all Non-GBR QoS flows for the concerned wireless device as specified in 3GPP TS 23.501;

stores the received Mobility Restriction List in the wireless device context;

store the received wireless device Security Capabilities in the wireless device context;

store the received Security Context in the wireless device context and take it into use as defined in 3GPP TS 33.501.

Upon reception of the UE History Information IE, which is included within the Source to Target Transparent Container IE of the HANDOVER REQUEST message, the target NG-RAN node 4 collects the information defined as mandatory in the UE History Information IE and, if supported, collects the information defined as optional in the UE History Information IE, for as long as the wireless device stays in one of its cells, and store the collected information to be used for future handover preparations.

Upon receiving the PDU Session Resource Setup List IE contained in the HANDOVER REQUEST message, the target NG-RAN node 4 behaves the same as defined in the PDU Session Resource Setup procedure. The target NG-RAN node 4 reports to the AMF 6 in the HANDOVER REQUEST ACKNOWLEDGE message the result for each PDU session resource requested to be setup (Step 2A). In particular, for each PDU session resource successfully setup, it includes the Handover Request Acknowledge Transfer IE containing the following information:

The list of QoS flows which have been successfully established in the QoS Flow Setup Response List IE.

The Data Forwarding Accepted IE if the data forwarding for the QoS flow is accepted.

The list of QoS flows which have failed to be established, if any, in the QoS Flow Failed to Setup List IE.

The UP transport layer information to be used for the PDU session.

The security result associated to the PDU session.

The redundant UP transport layer information to be used for the redundant transmission for the PDU session.

For each PDU session resource which failed to be setup, the Handover Resource Allocation Unsuccessful Transfer IE is included in the HANDOVER REQUEST ACKNOWLEDGE message containing a cause value that should be precise enough to enable the SMF to know the reason for the unsuccessful establishment.

For each PDU session included in the HANDOVER REQUEST ACKNOWLEDGE message, if the Current QoS Parameters Set Index IE is included for a QoS flow in the QoS Flow Setup Response List IE within the Handover Request Acknowledge Transfer IE the SMF considers it as the currently fulfilled QoS parameters set among the alternative QoS parameters for the involved QoS flow.

Upon reception of the HANDOVER REQUEST ACKNOWLEDGE message the AMF 6 shall, for each PDU session indicated in the PDU Session ID IE, transfer transparently the Handover Request Acknowledge Transfer IE or Handover Resource Allocation Unsuccessful Transfer IE to the SMF associated with the concerned PDU session.

If the HANDOVER REQUEST message contains the Data Forwarding Not Possible IE associated with a given PDU session within the Handover Request Transfer IE set to "data forwarding not possible", the target NG-RAN node 4 may not include the DL Forwarding UP TNL Information IE and for intra-system handover the Data Forwarding Response DRB List IE within the Handover Request Acknowledge Transfer IE in the HANDOVER REQUEST ACKNOWLEDGE message for that PDU session.

If the HANDOVER REQUEST message contains the Redundant PDU Session Information IE associated with a given PDU session within the Handover Request Transfer IE, the target NG-RAN node 4, if supported, stores the received information in the wireless device (UE) context and uses it for redundant PDU session setup as specified in 3GPP TS 38.300 and 3GPP TS 23.501. If the PDU Session Type IE is set to "ethernet" and the redundancy requirement is fulfilled using a secondary NG-RAN node 4, the NG-RAN node 4, if supported, includes the Global RAN Node ID of Secondary NG-RAN Node IE in the Handover Request Acknowledge Transfer IE of the HANDOVER REQUEST ACKNOWLEDGE message.

For each PDU session for which the Global RAN Node ID of Secondary NG-RAN Node IE is included in the Handover Request Acknowledge Transfer IE of the HANDOVER REQUEST ACKNOWLEDGE message, the SMF, if supported, handles this information as specified in 3GPP TS 23.501.

In case of intra-system handover, if the target NG-RAN node 4 accepts the downlink data forwarding for at least one QoS flow for which the DL Forwarding IE is set to "DL forwarding proposed", it may include the DL Forwarding UP TNL Information IE in the Handover Request Acknowledge Transfer IE as forwarding tunnel for the QoS flows listed in the QoS Flow Setup Response List IE of the HANDOVER REQUEST ACKNOWLEDGE message.

In case of intra-system handover, if the target NG-RAN node 4 accepts the uplink data forwarding for at least one QoS flow for which the UL Forwarding IE is set to "UL forwarding proposed", it may include the UL Forwarding UP TNL Information IE in the Handover Request Acknowledge Transfer IE for the PDU session within the PDU Session Resource Admitted List IE of the HANDOVER REQUEST ACKNOWLEDGE message.

In case of intra-system handover, for each PDU session for which the Additional DL UP TNL Information for HO List IE is included in the Handover Request Acknowledge Transfer IE of the HANDOVER REQUEST ACKNOWLEDGE message, the SMF considers the included Additional DL NG-U UP TNL Information IE as the downlink termination point for the associated flows indicated in the Additional QoS Flow Setup Response List IE for this PDU session split in different tunnels and shall consider the Additional DL Forwarding UP TNL Information IE, if included, as the forwarding tunnel associated to these QoS flows.

In case of intra-system handover, for each PDU session for which the Additional UL Forwarding UP TNL Information IE is included in the Handover Request Acknowledge Transfer IE of the HANDOVER REQUEST ACKNOWLEDGE message, the SMF considers it as the termination points for the uplink forwarding tunnels for this PDU session split in different tunnels.

In case of intra-system handover, if the target NG-RAN node 4 accepts the data forwarding for a successfully configured DRB, the target NG-RAN node 4 may include the DL Forwarding UP TNL Information IE for the DRB within the Data Forwarding Response DRB List IE within Handover Request Acknowledge Transfer IE of the HANDOVER REQUEST ACKNOWLEDGE message.

If the HANDOVER REQUEST ACKNOWLEDGE message contains the UL Forwarding UP TNL Information IE for a given DRB in the Data Forwarding Response DRB List IE within the Handover Request Acknowledge Transfer IE, it indicates the target NG-RAN node 4 has requested the forwarding of uplink data for the DRB.

In case of inter-system handover from E-UTRAN, if the PDU Session Resource Setup Request Transfer IE contains the Direct Forwarding Path Availability IE set to "direct path available", the target NG-RAN node 4, if supported, and if it accepts downlink data forwarding for the QoS flows mapped to an E-RAB of an admitted PDU session, includes the DL Forwarding UP TNL Information IE in the Data Forwarding Response E-RAB List IE in the Handover Request Acknowledge Transfer IE in the HANDOVER REQUEST ACKNOWLEDGE message for that mapped E-RAB.

In cases of inter-system handover from E-UTRAN, the target NG-RAN node 4 includes the Data Forwarding Accepted IE for each QoS flow that the DL Forwarding IE is set to "DL forwarding proposed" for the corresponding E-RAB in the Source NG-RAN Node to Target NG-RAN Node Transparent Container IE and that the target NG-RAN node 4 has admitted the proposed forwarding of downlink data for the QoS flow. If indirect data forwarding is applied for inter-system handover, if the target NG-RAN node 4 accepts the downlink data forwarding for at least one QoS flow of an admitted PDU session it shall include the DL Forwarding UP TNL Information IE in the PDU Session Resource Setup Response Transfer IE for that PDU session within the PDU Session Resources Admitted List IE of the HANDOVER REQUEST ACKNOWLEDGE message.

In case of inter-system handover from E-UTRAN with direct forwarding, if the target NG-RAN node 4 receives the SgNB UE X2AP ID IE in the Source NG-RAN Node to Target NG-RAN Node Transparent Container IE, it may use it for internal forwarding as described in 3GPP TS 37.340.

The target NG-RAN node 4 uses the information in the Mobility Restriction List IE if present in the HANDOVER REQUEST message to
- determine a target for subsequent mobility action for which the target NG-RAN node 4 provides information about the target of the mobility action towards the wireless device;
- select a proper SCG during dual connectivity operation;
- assign proper RNA(s) for the wireless device when moving the wireless device to RRC_INACTIVE state.

If the Mobility Restriction List IE is not contained in the HANDOVER REQUEST message, the target NG-RAN node 4 considers that no roaming and no access restriction apply to the wireless device. The target NG-RAN node also considers that no roaming and no access restriction apply to the wireless device when:
- one of the QoS flows includes a particular ARP value (3GPP TS 23.501).

If the Trace Activation IE is included in the HANDOVER REQUEST message the target NG-RAN node, if supported, initiates the requested trace function as described in 3GPP TS 32.422. In particular, the NG-RAN node, if supported:
- if the Trace Activation IE includes the MDT Activation IE set to "Immediate MDT and Trace", initiates the requested trace session and MDT session as described in 3GPP TS 32.422;
- if the Trace Activation IE includes the MDT Activation IE set to "Immediate MDT Only", "Logged MDT only", initiates the requested MDT session as described in 3GPP TS 32.422 and the target NG-RAN node 4 ignores the Interfaces To Trace IE and the Trace Depth IE;
- if the Trace Activation IE includes the MDT Location Information IE within the MDT Configuration IE, stores this information and takes it into account in the requested MDT session;
- if the Trace Activation IE includes the Signalling Based MDT PLMN List IE within the MDT Configuration IE, the NG-RAN node may use it to propagate the MDT Configuration as described in 3GPP TS 37.320.
- if the Trace Activation IE includes the Bluetooth Measurement Configuration IE within the MDT Configuration IE, takes it into account for MDT Configuration as described in 3GPP TS 37.320.
- if the Trace Activation IE includes the WLAN Measurement Configuration IE within the MDT Configuration IE, takes it into account for MDT Configuration as described in 3GPP TS 37.320.
- if the Trace Activation IE includes the Sensor Measurement Configuration IE within the MDT Configuration IE, takes it into account for MDT Configuration as described in 3GPP TS 37.320.
- if the Trace Activation IE includes the MDT Configuration IE and if the NG-RAN node is a gNB at least the MDT Configuration-NR IE is present, while if the NG-RAN node 4 is an ng-eNB at least the MDT Configuration-EUTRA IE is present.

If the Location Reporting Request Type IE is included in the HANDOVER REQUEST message, the target NG-RAN node performs the requested location reporting functionality for the wireless device as described in subclause 8.12 of 3GPP 38.413.

If the Core Network Assistance Information for RRC INACTIVE IE is included in the HANDOVER REQUEST message, the target NG-RAN node 4, if supported, stores this information in the wireless device context and uses it for, e.g., the RRC_INACTIVE state decision and RNA configuration for the wireless device and RAN paging if any for a wireless device in RRC_INACTIVE state, as specified in 3GPP TS 38.300.

If the CNAssisted RAN Parameters Tuning IE is included in the HANDOVER REQUEST message, the NG-RAN node 4 may use it as described in 3GPP TS 23.501.

If the New Security Context Indicator IE is included in the HANDOVER REQUEST message, the target NG-RAN node 4 uses the information as specified in 3GPP TS 33.501.

If the NASC IE is included in the HANDOVER REQUEST message, the target NG-RAN node 4 uses it towards the wireless device as specified in 3GPP TS 33.501.

If the RRC Inactive Transition Report Request IE is included in the HANDOVER REQUEST message, the NG-RAN node 4, if supported, stores this information in the wireless device (UE) context.

If the Redirection for Voice EPS Fallback IE is included in the HANDOVER REQUEST message, the NG-RAN node 4, if supported, stores it and use it in a subsequent decision of EPS fallback for voice as specified in 3GPP TS 23.502.

If the SRVCC Operation Possible IE is included in the HANDOVER REQUEST message, the target NG-RAN node 4, if supported, stores the content of the received SRVCC Operation Possible IE in the UE context and use it as defined in 3GPP TS 23.216.

If the IAB Authorized IE is contained in the HANDOVER REQUEST message, the NG-RAN node 4, if supported, considers that the handover is for an IAB node.

If the Enhanced Coverage Restriction IE is included in the HANDOVER REQUEST message, the NG-RAN node 4, if supported, stores this information in the UE context and use it as defined in 3GPP TS 23.501.

If the UE Differentiation Information IE is included in the HANDOVER REQUEST message, the NG-RAN node 4, if supported, stores this information in the UE context for further use according to 3GPP TS 23.501.

If the UE User Plane CIoT Support Indicator IE is included in the HANDOVER REQUEST message the NG-RAN node 4, if supported, stores this information in the UE context and consider that User Plane CIoT 5GS Optimisation as specified in 3GPP TS 23.501 is supported for the wireless device.

Upon reception of the UE History Information from UE IE, which is included within the Source to Target Transparent Container IE of the HANDOVER REQUEST message, the target NG-RAN node 4, if supported, stores the collected information and use it for future handover preparations.

After all necessary resources for the admitted PDU session resources have been allocated, the target NG-RAN node generates the HANDOVER REQUEST ACKNOWLEDGE message.

For each QoS flow which has been established in the target NG-RAN node 4, if the QoS Monitoring Request IE was included in the QoS Flow Level QoS Parameters IE contained in the HANDOVER REQUEST message, the target NG-RAN node 4 stores this information, and, if supported, perform delay measurement and QoS monitoring, as specified in 3GPP TS 23.501.

If the NR V2X Services Authorized IE is contained in the HANDOVER REQUEST message and it contains one or more IEs set to "authorized", the NG-RAN node 4, if supported, considers that the wireless device is authorized for the relevant service(s).

If the LTE V2X Services Authorized IE is contained in the HANDOVER REQUEST message and it contains one or more IEs set to "authorized", the NG-RAN node 4, if supported, considers that the wireless device is authorized for the relevant service(s).

If the NR UE Sidelink Aggregate Maximum Bit Rate IE is included in the HANDOVER REQUEST message, the NG-RAN node 4, if supported, uses the received value for the concerned wireless device's sidelink communication in network scheduled mode for NR V2X services.

If the LTE UE Sidelink Aggregate Maximum Bit Rate IE is included in the HANDOVER REQUEST message, the NG-RAN node 4, if supported, uses the received value for the concerned wireless device's sidelink communication in network scheduled mode for LTE V2X services.

If the PC5 QoS Parameters IE is included in the HANDOVER REQUEST message, the NG-RAN node 4, if supported, uses it as defined in 3GPP TS 23.287.

If the CE-mode-B Restricted IE is included in the HANDOVER REQUEST message and the Enhanced Coverage Restriction JE is not set to "restricted" and the Enhanced Coverage Restriction information stored in the UE context is not set to "restricted", the NG-RAN node 4, if supported, stores this information in the UE context and use it as defined in 3GPP TS 23.501.

If the Management Based MDT PLMN List IE is contained in the HANDOVER REQUEST message, the target NG-RAN node 4, if supported, stores the received information in the UE context, and use this information to allow subsequent selections of the wireless device for management based MDT defined in 3GP TS 32.422.

If the HANDOVER REQUEST message contains the UE Radio Capability ID IE, the NG-RAN node 4, if supported, uses it as specified in 3GPP TS 23.501 and 3GPP TS 23.502.

If the DAPS Request Information IE is included for a DRB in the Source NG-RAN Node to Target NG-RAN Node Transparent Container IE within the HANDOVER REQUEST message, the target NG-RAN node 4 considers that the request concerns a DAPS Handover for that DRB, as described in 3GPP TS 38.300. The target NG-RAN node 4 includes the DAPS Response information List IE in the Target NG-RAN Node 4 to Source NG-RAN Node Transparent Container IE within the HANDOVER REQUEST ACKNOWLEDGE message, containing the DAPS Response Information IE for each DRB requested to be configured with DAPS Handover.

Interactions with RRC Inactive Transition Report Procedure:

If the RRC Inactive Transition Report Request IE is included in the HANDOVER REQUEST message and set to "subsequent state transition report", the NG-RAN node 4, if supported, sends the RRC INACTIVE TRANSITION REPORT message to the AMF 6 to report the RRC state of the UE when the UE enters or leaves RRC_INACTIVE state. FIG. 5 is a signalling diagram of an example of handover resource allocation: unsuccessful operation. The target NG-RAN node 4 receives a handover request message from the AMF 6 as, for example, described above (Step 1B).

If the target NG-RAN node 4 does not admit any of the PDU session resources, or a failure occurs during the Handover Preparation, target NG-RAN node 4 sends the HANDOVER FAILURE message to the AMF 6 with an appropriate cause value (Step 2B).

Abnormal Conditions

If the supported algorithms for encryption defined in the Encryption Algorithms IE in the UE Security Capabilities IE, plus the mandated support of EEA0 and NEA0 in all wireless devices (3GPP TS 33.501), do not match any allowed algorithms defined in the configured list of allowed encryption algorithms in the NG-RAN node 4 (3GPP TS 33.501), the target NG-RAN node 4 rejects the procedure using the HANDOVER FAILURE message.

If the supported algorithms for integrity defined in the Integrity Protection Algorithms IE in the UE Security Capabilities IE, plus the mandated support of the EIA0 and NIA0 algorithm in all wireless devices (3GPP TS 33.501), do not match any allowed algorithms defined in the configured list of allowed integrity protection algorithms in the NG-RAN node 4 (3GPP TS 33.501), the target NG-RAN node 4 rejects the procedure using the HANDOVER FAILURE message.

If the target NG-RAN node 4 receives a HANDOVER REQUEST message which does not contain the Mobility Restriction List IE, and the serving PLMN cannot be determined otherwise by the NG-RAN node 4, the target NG-RAN node 4 rejects the procedure using the HANDOVER FAILURE message.

If the target NG-RAN node 4 receives a HANDOVER REQUEST message containing the Mobility Restriction List IE, and the serving PLMN indicated is not supported by the target cell, the target NG-RAN node 4 rejects the procedure using the HANDOVER FAILURE message.

If the target NG-RAN node 4 receives a HANDOVER REQUEST message containing an Allowed PNI-NPN List IE in the Mobility Restriction List IE which does not allow access to the cell indicated in the Target Cell ID IE, the target NG-RAN node rejects the procedure using the HANDOVER FAILURE message with an appropriate cause value and may include the Cell CAG Information IE corresponding to this cell and the selected PLMN.

If the target NG-RAN node 4 receives a HANDOVER REQUEST message containing a Serving PLMN IE and Serving NID IE in the Mobility Restriction List IE which does not allow access to the cell indicated in the Target Cell ID IE, the target NG-RAN node 4 rejects the procedure using the HANDOVER FAILURE message with an appropriate cause value.

Inter-Node Messages in Case of Separation of gNB-CU-CP and gNB-CU-UP

A network node, e.g., gNB-CU, can be split in two logical entities, namely gNB-CU-CP 8 for the control plane functions and gNB-CU-UP 9 for the user plane functions. The interface between these two nodes is called E1. Such architecture is described in 3GPP TS 38.401 section 6.1.2.

Examples of procedures involving these network nodes is described in 3GPP TS 38.401. The messages exchanged on the E1 interface during these procedures are defined in 3GPP TS 38.463. For example, in case of inter-system handover from 4G to 5G, the wireless device performs initial access in the target gNB (e.g., network node) at handover execution. The procedure is described below.

Ue (e.g., Wireless Device) Initial Access

The signalling flow for UE Initial access involving E1 and F1 is illustrated in FIG. 6. The steps of this procedure are described below:

1-8. Defined in clause 8.1 of 3GPP 38.401 or 3GPP 38.463.

9. The gNB-CU-CP 8 sends the BEARER CONTEXT SETUP REQUEST message to establish the bearer context in the gNB-CU-UP 9.

10. The gNB-CU-UP 9 sends the BEARER CONTEXT SETUP RESPONSE message to the gNB-CU-CP 8, including F1-U UL TEID and transport layer address allocated by the gNB-CU-UP 9.

11-13. Defined in clause 8.1 of 3GPP 38.401 or 3GPP 38.463.

14. The gNB-CU-CP 8 sends the BEARER CONTEXT MODIFICATION REQUEST message to the gNB-CU-UP 9, including F1-U DL TEID and transport layer address allocated by the gNB-DU 7.

15. The gNB-CU-UP 9 sends the BEARER CONTEXT MODIFICATION RESPONSE message to the gNB-CU-CP 8.

16-22. Defined in clause 8.1 of 3GPP 38.401 or 3GPP 38.463.

NOTE: Steps 14-15 and steps 16-17 can occur in parallel, but both are before step 18.

In handovers including gNB-CU-CP 8 and gNB-CU-UP 9, the procedures involved on E1 interface are Bearer Context Setup and Bearer Context Modification. These procedures are described in details in 3GPP TS 38.463.

However, in case of inter-system handover from 4G (i.e., a first RAT) to 5G (i.e., a second RAT), the target network node may be a disaggregated gNB (i.e., split in three separated logical entities namely gNB-CU-CP 8, gNB-CU-UP 9 and gNB-DU 7). In that case the gNB-CU-UP 9 hosting the User Plane functions of the gNB-CU will not know that the actions required by the Control Plane entity (i.e., the gNB-CU-CP 8) due to an inter-system handover. Therefore, the gNB-CU-UP 9 is not able to perform some specific actions required by this type of handover, such as SDAP header creation (if configured) or PDCP SNs discarding for PDCP SDUs received from the source network node.

A gNB-CU-UP 9 being able to communicate with both eNBs (e.g., 4G network node) (via X2 interface) and NG-RAN nodes (e.g., 5G network node) (via Xn interface) may be configured by the operators with two different sets of IP addresses (i.e., 1 for Xn interface and 1 for X2 interface). However, if the target gNB-CU-UP 9 is not aware that the bearer context establishment procedure is associated to an inter-system handover, the target gNB-CU-UP 9 may not be able to select the right User Plane tunnels information, i.e., the right IP address, e.g., X2 address for inter-system handover.

SUMMARY

Some embodiments advantageously provide methods, systems, and apparatuses for helping avoid misconfiguration for data forwarding associated with inter-system handover such as, for example, by using an indication that indicates ignore at least one packet data convergence protocol, PDCP, sequence number, SN, associated with a source network node.

Enable the possibility for the target gNB-CU-UP to understand that the data forwarding information (i.e., tunnel endpoints) required by the gNB-CU-CP during Bearer Context establishment or modification are needed for an inter-system handover with direct data forwarding. This enables the gNB-CU-UP to ignore the PDCP SNs of the PDCP SDUs received from the source node as forwarded data and to add an SDAP header to these packets, if configured.

Without the teachings of the present disclosure, the burden of removing the PDCP SNs from the transferred PDCP SDUs is on the source node, which may restrict the implementation in case dual-connectivity was established before the handover (because the source SN does not know that the data is forwarded due to an inter-system handover and that the PDCP SNs need to be removed before transmission).

However, in case of 4G to 5G handover, this will impact nodes with lower processing capacities, and impact the performances.

Also, the teachings described herein help avoid misconfiguration between the wireless device and the gNB-CU-UP, when the wireless device is expecting an SDAP header, which needs to be created by the gNB-CU-UP.

One or more embodiments described herein provide one or more methods where, for example, a high layer split architecture supports the NR RAT. Equivalent functions may also be expected for RAN nodes that follow a similar high layer split architecture. For example, the teachings described herein applicable to cases where eNBs are split into CU/DU and CU-CP/CU-UP. Therefore, methods described below are equally applicable to NG-RAN nodes providing E-UTRA or to E-UTRAN nodes:

Methods for gNB-CU-CP are applicable to CU-CP part of an eNB in both E-UTRAN or NG-RAN Methods for gNB-CU-UP are applicable to CU-UP part of an eNB in both E-UTRAN or NG-RAN Methods for gNB-DU are applicable to DU part of an eNB in both E-UTRAN or NG-RAN One or more embodiments relate to a method at a target gNB-CU-CP (e.g., target network node-CU-CP of a second RAT) that receives a handover preparation request from an AMF, the method comprising:

identifying that the request is concerning an inter-system handover;

deciding that the PDCP SNs of the PDCP SDUs received from the source network node are not to be transferred to the wireless device and informing the target gNB-CU-UP of its decision;

configuring the target gNB-CU-UP to add or not an SDAP header to the downlink packets send to the wireless device;

including an indicator in messages aimed at creating a bearer context (e.g., Bearer Context Setup/Modification messages) sent to the target gNB-CU-UP over E1 interface, informing the target gNB-CU-UP that the procedure is associated to an inter-system data forwarding;

receiving from the target gNB-CU-UP the User Plane tunnels information for inter-system data forwarding.

In one or more embodiments, a method at a target gNB-CU-UP that receives a request from a target gNB-CU-CP for a wireless device the method comprising:

Receiving from a target gNB-CU-CP a message over E1 interface aimed at creating a bearer context (e.g., Bearer Context Setup/Modification messages), including an indicator informing that the procedure is associated to an inter-system data forwarding and/or requesting to ignore the PDCP SNs from the PDCP SDUs received from the source node before their transmission to the UE and/or requesting the creation of an SDAP header if not received from the source node;

Subsequently ignoring and discarding the PDCP SNs of the PDCP SDUs received from the source node;

If configured by the target gNB-CU-CP, creating an SDAP header for PDCP SDUs received from the source node before transmission to the UE;

Sending to the target gNB-CU-CP the User Plane tunnels information for inter-system data forwarding.

According to one aspect of the present disclosure, a network node including a target central unit, CU, the target CU including a CU-control plane, CU-CP, and a CU-user plane, CU-UP, that are in communication with each other via at least one interface, is provided. The network node includes processing circuitry configured to identify, at the CU-CP, a handover request associated with an inter-system handover, determine, at the CU-CP, a configuration for the CU-UP to one of add and omit a service data adaptation protocol, SDAP, header for at least one inter-system data packet that is to be transmitted to a wireless device where the determination is based at least on the identification of the handover request, and cause, at the CU-CP, transmission of at least one message over the interface, the at least one message configured to: initiate a bearer context procedure, indicate that the bearer context procedure is associated with the inter-system handover, and indicate the configuration of the CU-UP.

According to one or more embodiments of this aspect, the processing circuitry is further configured to determine, at the CU-CP, that the CU-UP is not to transfer at least one packet data convergence protocol, PDCP, sequence number, SN, of at least one PDCP service data units, SDU, received from a source network node, to the wireless device. The configuring of the CU-UP further includes configuring the CU-UP to discard the at least one PDCP SN, received from the source network node, from the at least one PDCP SDU based at least on the determination. According to one or more embodiments of this aspect, the network node is a first radio access technology, RAT, network node and the source network node is a second RAT network node, the first RAT being different from the second RAT. According to one or more embodiments of this aspect, the processing circuitry is further configured to receive, at the CU-CP, user plane tunnel information for inter-system handover where the user plane tunnel information is based on the at least one message.

According to one or more embodiments of this aspect, the at least one message corresponds to one of a bearer context setup message and bearer context modification message. According to one or more embodiments of this aspect, the network node is a disaggregated network node where the CU-CP and CU-UP are respective logical entities of the disaggregated network node. According to one or more embodiments of this aspect, the processing circuitry is further configured to receive, at the CU-CP, the handover request from an Access and Mobility management Function, AMF. According to one or more embodiments of this aspect, the at least one message is associated with user plane tunnel endpoints required by the CU-CP.

According to another aspect of the present disclosure, a method implemented by a network node that includes a target central unit, CU, the target CU including a CU-control plane, CU-CP, and a CU-user plane, CU-UP, that are in communication with each other via at least one interface, is provided. A handover request associated with an inter-system handover is identified at the CU-CP. A configuration for the CU-UP to one of add and omit a service data adaptation protocol, SDAP, header for at least one inter-system data packet that is to be transmitted to a wireless device is determined at the CU-CP where the determination is based at least on the identification of the handover request. Transmission at the CU-CP is caused of at least one message over the interface where the at least one message is configured to: initiate a bearer context procedure, indicate that the bearer context procedure is associated with the inter-system handover, and indicate the configuration of the CU-UP.

According to one or more embodiments of this aspect, a determination is performed at the CU-CP that the CU-UP is not to transfer at least one packet data convergence protocol, PDCP, sequence number, SN, of at least one PDCP service data units, SDU, received from a source network node, to the wireless device. The configuring of the CU-UP further includes configuring the CU-UP to discard the at least one PDCP SN, received from the source network node, from the at least one PDCP SDU based at least on the determination. According to one or more embodiments of this aspect, the network node is a first radio access technology, RAT, network node and the source network node is a second RAT network node where the first RAT is different from the second RAT. According to one or more embodiments of this aspect, user plane tunnel information for inter-system handover is received at the CU-CP where the user plane tunnel information is based on the at least one message.

According to one or more embodiments of this aspect, the at least one message corresponds to one of a bearer context setup message and bearer context modification message. According to one or more embodiments of this aspect, the network node is a disaggregated network node where the CU-CP and CU-UP are respective logical entities of the disaggregated network node. According to one or more embodiments of this aspect, the handover request is received at the CU-CP from an Access and Mobility management Function, AMF. According to one or more embodiments of this aspect, the at least one message is associated with user plane tunnel endpoints required by the CU-CP.

According to another aspect of the present disclosure, a network node including a target central unit, CU, the target CU including a CU-control plane, CU-CP, and a CU-user plane, CU-UP that are in communication with each other via at least one interface is provided. The network node includes processing circuitry configured to: receive, at the CU-UP, at least one message over the interface, the at least one message configured to initiate a bearer context procedure, indicate that the bearer context procedure is associated with an inter-system handover and indicate a configuration of the CU-UP where the configuration of the CU-UP indicates to one of add and omit a service data adaptation protocol, SDAP, header for at least one inter-system data packet that is to be transmitted to a wireless device. The processing circuitry is further configured to operate, at the CU-UP, according to the configuration of the CU-UP indicated in the at least one message, and cause, at the CU-UP, transmission of user plane tunnel information for inter-system data forwarding associated with inter-system handover.

According to one or more embodiments of this aspect, the processing circuitry is further configured to select, at the CU-UP, the user plane tunnel information based on a handover type associated with the inter-system handover. According to one or more embodiments of this aspect, the user plane tunnel information includes user plane tunnel endpoints required by the CU-CP. According to one or more embodiments of this aspect, the configuration of the CU-UP further indicates for the CU-UP to discard at least one packet data convergence protocol, PDCP, sequence number, SN, of at least one PDCP service data units, SDU, received from a source network node, to the wireless device. The operating, at the CU-|UP, includes discarding the at least one PDCP SN, received from the source network node, from the at least one PDCP SDU based at least on the indicated configuration of the CU-UP.

According to one or more embodiments of this aspect, the network node is a first radio access technology, RAT, network node and the source network node is a second RAT network node where the first RAT is different from the second RAT. According to one or more embodiments of this aspect, the at least one message corresponds to one of a bearer context setup message and bearer context modification message. According to one or more embodiments of this aspect, the network node is a disaggregated network node where the CU-CP and CU-UP are respective logical entities of the disaggregated network node.

According to another aspect of the present disclosure, a method implemented by a network node including a target central unit, CU, the target CU including a CU-control plane, CU-CP, and a CU-user plane, CU-UP that are in communication with each other via at least one interface is provided. At least one message is received at the CU-UP over the interface where the at least one message configured to initiate a bearer context procedure, indicate that the bearer context procedure is associated with an inter-system handover and indicate a configuration of the CU-UP, the configuration of the CU-UP indicating to one of add and omit a service data adaptation protocol, SDAP, header for at least one inter-system data packet that is to be transmitted to a wireless device. The CU-UP operates according to the configuration of the CU-UP indicated in the at least one message. Transmission is caused at the CU-UP of user plane tunnel information for inter-system data forwarding associated with inter-system handover.

According to one or more embodiments of this aspect, the user plane tunnel information is selected at the CU-UP based on a handover type associated with the inter-system handover. According to one or more embodiments of this aspect, the user plane tunnel information includes user plane tunnel endpoints required by the CU-CP. According to one or more embodiments of this aspect, the configuration of the CU-UP further indicates for the CU-UP to discard at least one packet data convergence protocol, PDCP, sequence number, SN, of at least one PDCP service data units, SDU, received from a source network node, to the wireless device. The operating, at the CU-IUP, includes discarding the at least one PDCP SN, received from the source network node, from the at least one PDCP SDU based at least on the indicated configuration of the CU-UP.

According to one or more embodiments of this aspect, the network node is a first radio access technology, RAT, network node and the source network node is a second RAT network node where the first RAT is different from the second RAT. According to one or more embodiments of this aspect, the at least one message corresponds to one of a bearer context setup message and bearer context modification message. According to one or more embodiments of this aspect, the network node is a disaggregated network node where the CU-CP and CU-UP are respective logical entities of the disaggregated network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 4 is a diagram of handover resource allocation: successful operation;

FIG. 5 is a diagram of handover resource allocation: unsuccessful operation;

DETAILED DESCRIPTION

Figure 1:
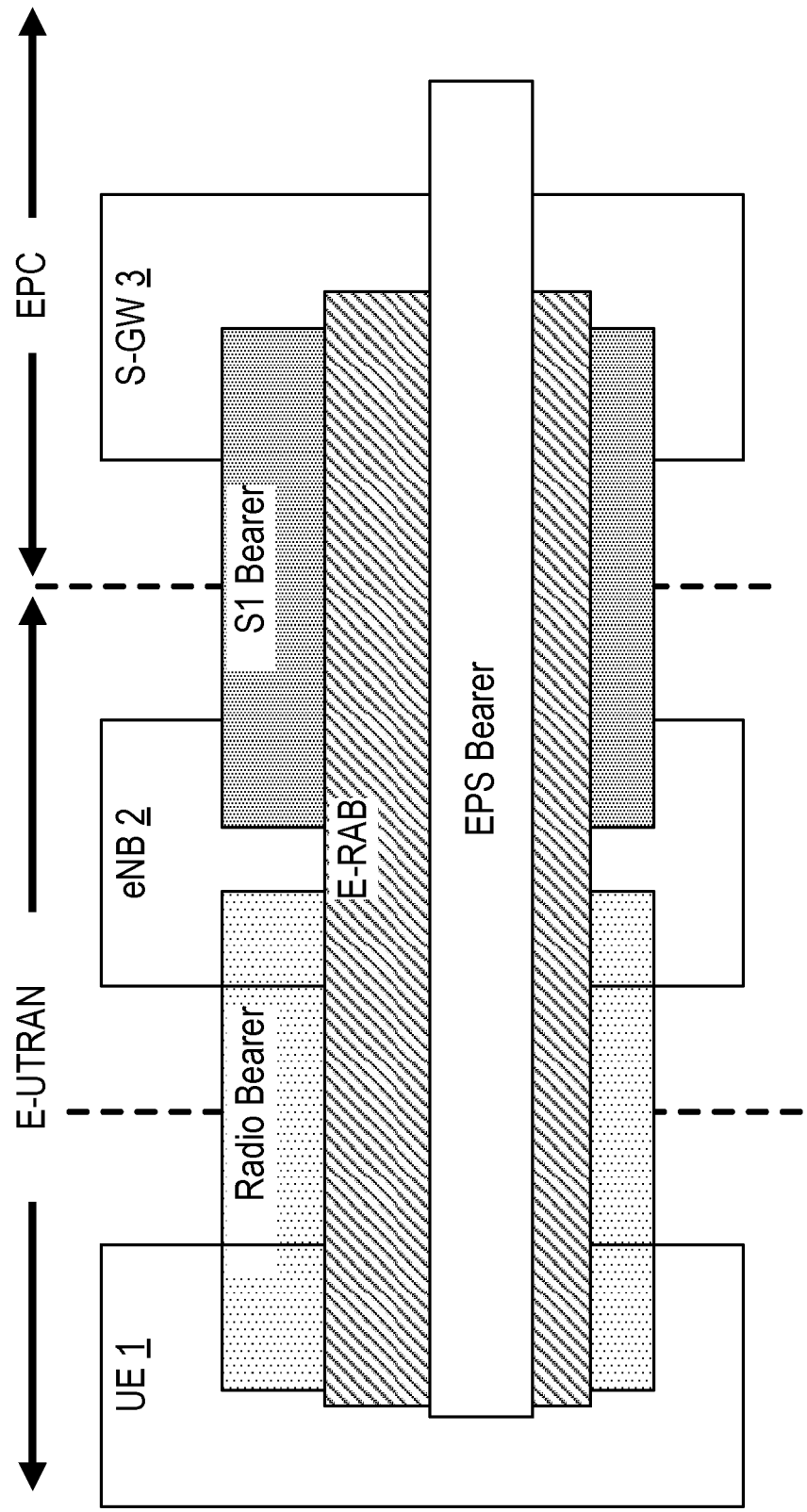
FIG. 1 is a diagram of a 4G QoS architecture.
Figure 2:
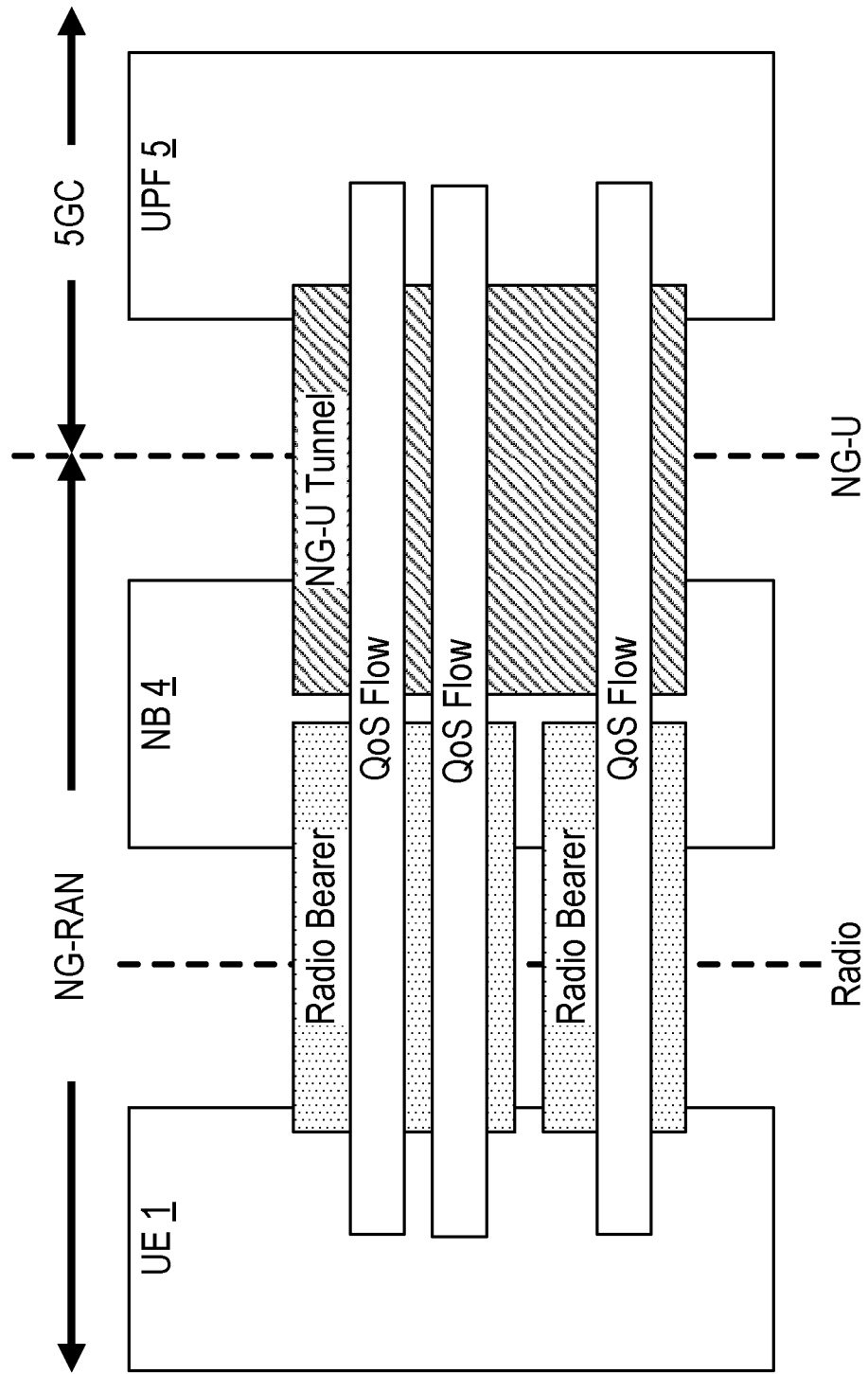
FIG. 2 is a diagram of a 5G QoS architecture.
Figure 3:
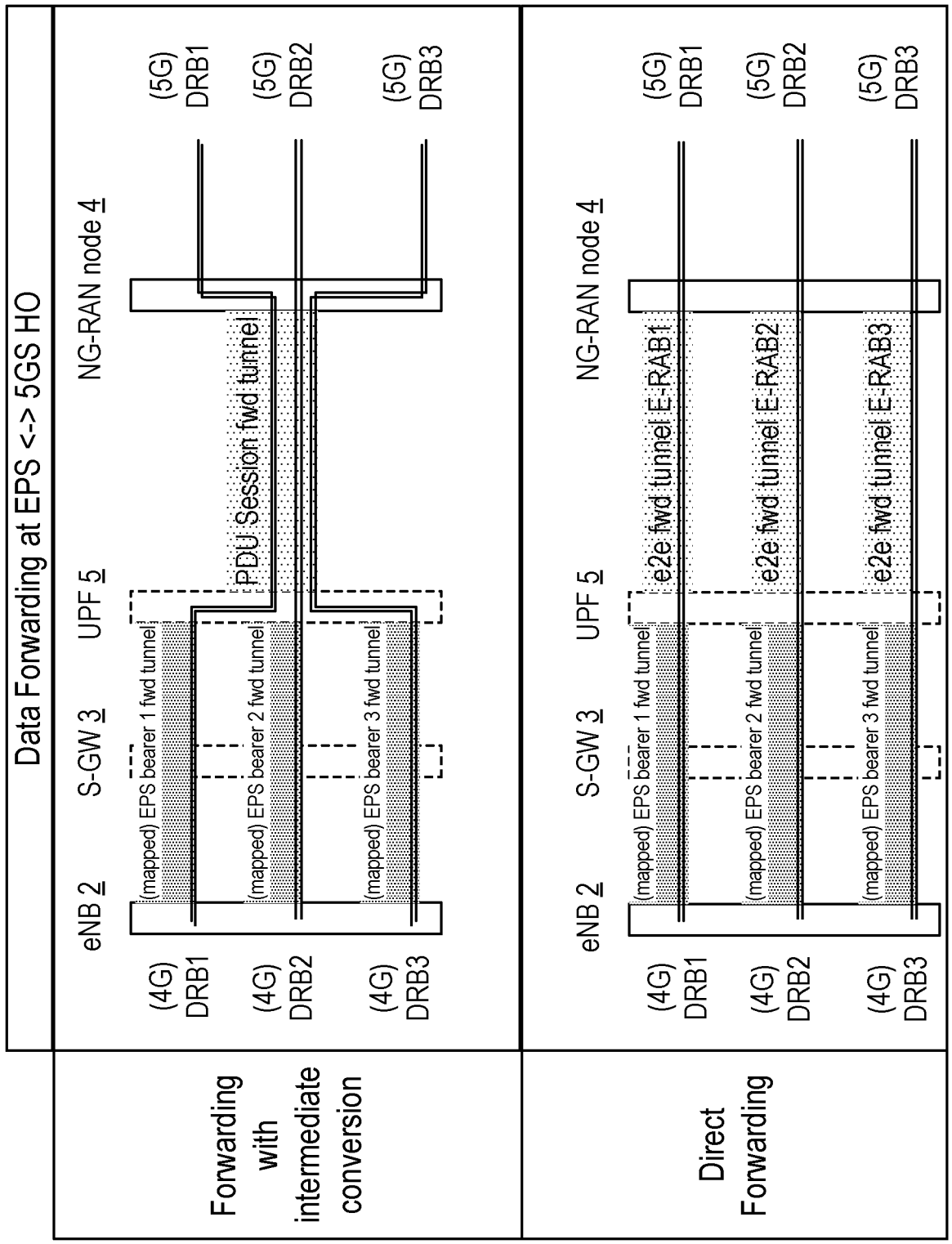
FIG. 3 s a diagram of indirect vs direct data forwarding in inter-system handover.
Figure 6:
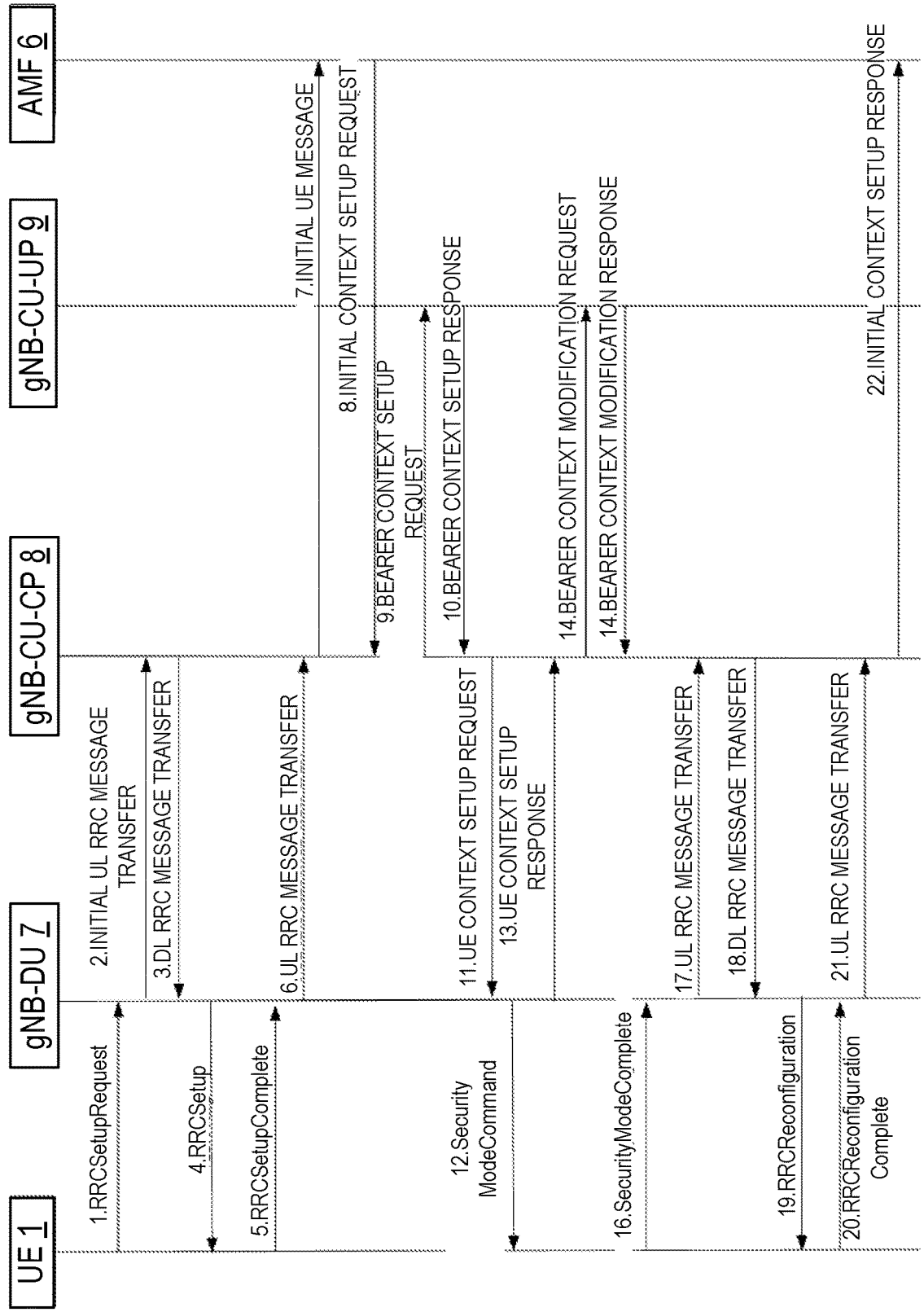
FIG. 6 is a diagram of UE initial access procedure involving E1 and F1.

Before describing in detail exemplary embodiments, it is noted that the embodiments reside primarily in combinations of apparatus components and processing steps related to helping avoid misconfiguration for data forwarding associated with inter-system handover such as, for example, by using an indication that indicates ignore at least one packet data convergence protocol, PDCP, sequence number, SN, associated with a source network node. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide helping avoid misconfiguration for data forwarding associated with inter-system handover such as, for example, by using an indication that indicates ignore at least one packet data convergence protocol, PDCP, sequence number, SN, associated with a source network node.

Figure 7:
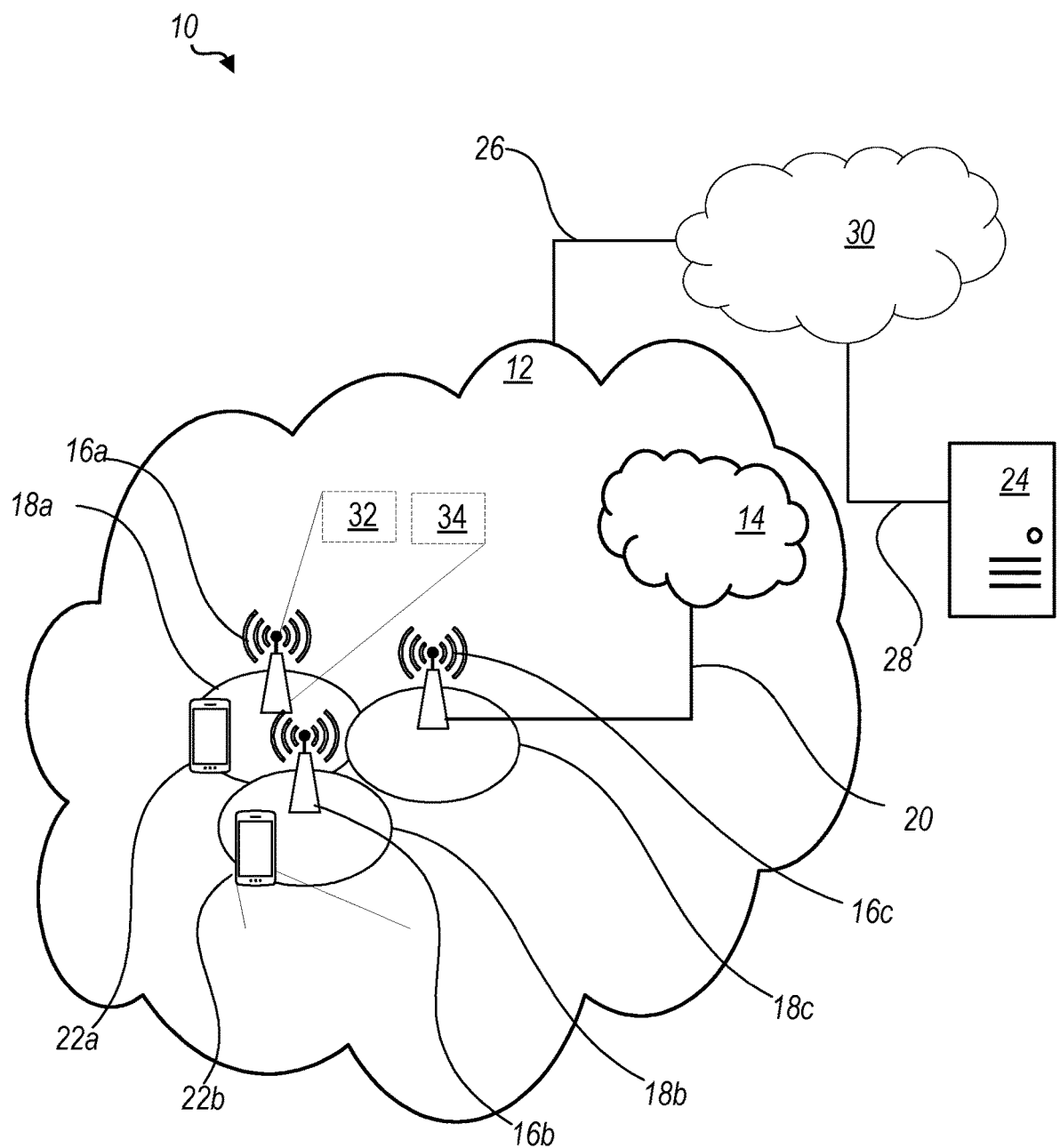
FIG. 7 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 7 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 7 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a central unit-control plane (CU-CP) unit 32 (also referred to as generally as CU-CP 32 and in some specific embodiments gNB-CU-CP 32 or eNB-CU-CP 32) which is configured to perform one or more network node 16 functions as described herein such as with respect to helping avoid misconfiguration for data forwarding associated with inter-system handover such as, for example, by using an indication that indicates ignore at least one packet data convergence protocol, PDCP, sequence number, SN, associated with a source network node. A network node 16 is configured to include a central unit-user plane (CU-UP) unit 34 (also referred to as generally as CU-UP 34 and in some specific embodiments gNB-CU-UP 34 or eNB-CU-UP 34) which is configured to perform one or more network node 16 functions as described herein such as with respect to helping avoid misconfiguration for data forwarding associated with inter-system handover such as, for example, by using an indication that indicates ignore at least one packet data convergence protocol, PDCP, sequence number, SN, associated with a source network node. In one or more embodiments, CU-CP 32 and CU-UP 34 are part of a split architecture as described herein.

Example implementations, in accordance with an embodiment, of the WD 22, network node 16 and host computer 24 discussed in the preceding paragraphs will now be described with reference to FIG. 8. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, provide, analyze, transmit, receive, forward, relay, etc. information related to helping avoid misconfiguration for data forwarding associated with inter-system handover such as, for example, by using an indication that indicates ignore at least one packet data convergence protocol, PDCP, sequence number, SN, associated with a source network node.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16.

The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include CU-CP unit 32 configured to [insert function recited in the embodiments]. The processing circuitry 68 may also include central unit-control plane (CU-CP) unit 32 (also referred to as generally as CU-CP 32 and in some specific embodiments gNB-CU-CP 32 or eNB-CU-CP 32) which is configured to perform one or more network node 16 functions as described herein such as with respect to helping avoid misconfiguration for data forwarding associated with inter-system handover such as, for example, by using an indication that indicates ignore at least one packet data convergence protocol, PDCP, sequence number, SN, associated with a source network node. The processing circuitry 68 may also include central unit-user plane (CU-UP) unit 34 (also referred to as generally as CU-UP 34 and in some specific embodiments gNB-CU-UP 34 or eNB-CU-UP 34) which is configured to perform one or more network node 16 functions as described herein such as with respect to helping avoid misconfiguration for data forwarding associated with inter-system handover such as, for example, by using an indication that indicates ignore at least one packet data convergence protocol, PDCP, sequence number, SN, associated with a source network node.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 8:
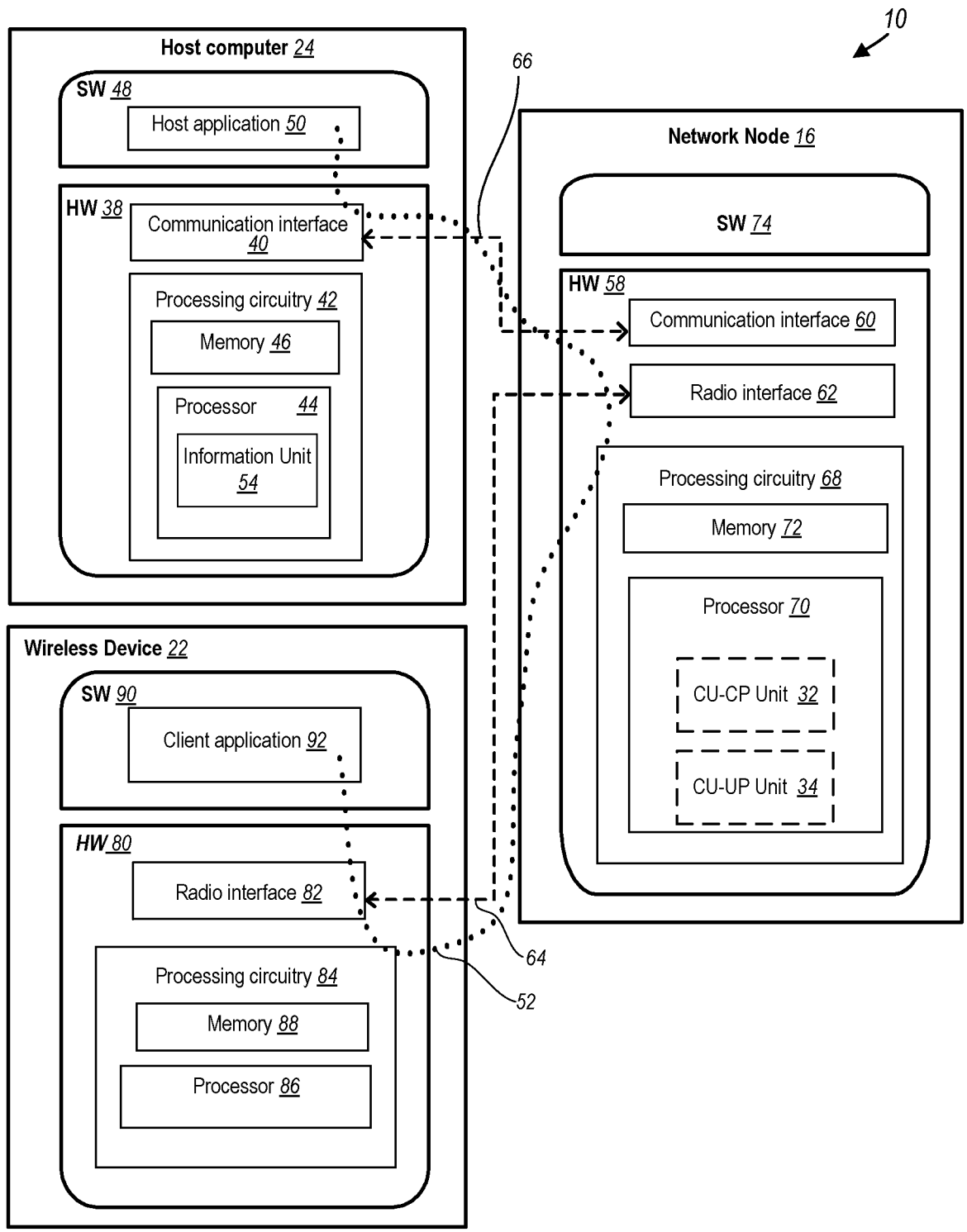
FIG. 8 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 8 and independently, the surrounding network topology may be that of FIG. 7.

In FIG. 8, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both.

While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 7 and 8 show various "units" such as CU-CP unit 32 and CU-UP unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 9, 10:
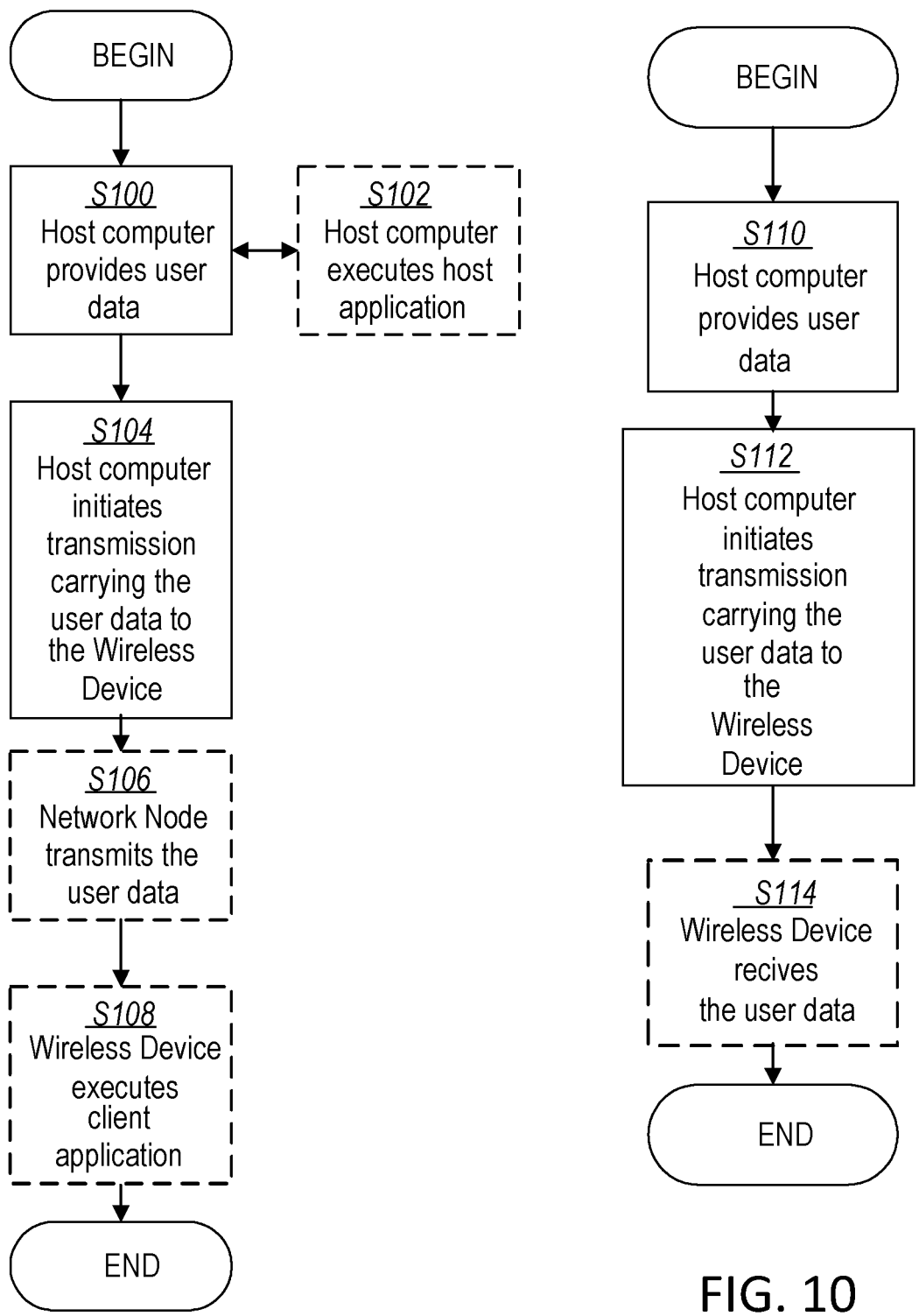
FIG. 9 is a flowchart illustrating exemplary methods implemented in a communication system including a host computer, a network node and a wireless device for executing a client application at a wireless device according to some embodiments of the present disclosure.
FIG. 10 is a flowchart illustrating exemplary methods implemented in a communication system including a host computer, a network node and a wireless device for receiving user data at a wireless device according to some embodiments of the present disclosure.

FIG. 9 is a flowchart illustrating an exemplary method implemented in a communication system, such as, for example, the communication system of FIGS. 7 and 8, in accordance with one embodiment. The communication system may include a host computer 24, a network node 16 and a WD 22, which may be those described with reference to FIG. 8. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 10 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 11, 12:
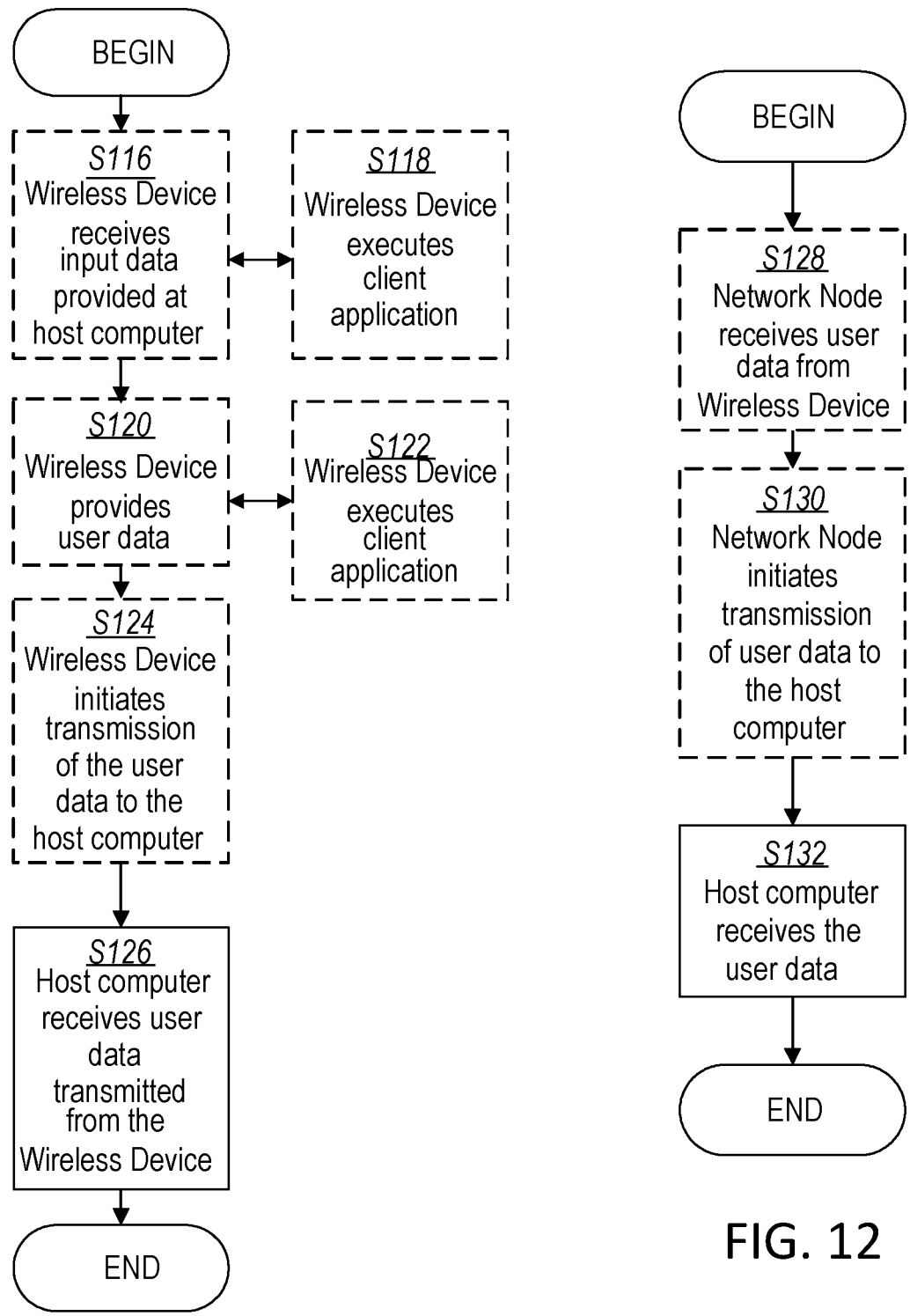
FIG. 11 is a flowchart illustrating exemplary methods implemented in a communication system including a host computer, a network node and a wireless device for receiving user data from the wireless device at a host computer according to some embodiments of the present disclosure.
FIG. 12 is a flowchart illustrating exemplary methods implemented in a communication system including a host computer, a network node and a wireless device for receiving user data at a host computer according to some embodiments of the present disclosure.

FIG. 11 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 12 is a flowchart illustrating an exemplary method implemented in a communication system, such as, for example, the communication system of FIG. 7, in accordance with one embodiment. The communication system may include a host computer 24, a network node 16 and a WD 22, which may be those described with reference to FIGS. 7 and 8. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 13:
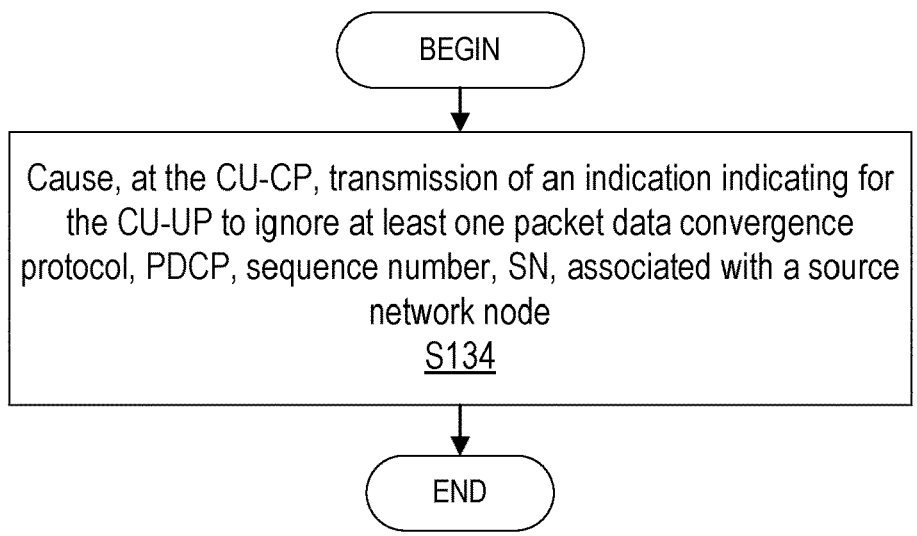
FIG. 13 is a flowchart of an example process in a network node according to some embodiments of the present disclosure.

FIG. 13 is a flowchart of an example process in a network node 16 according to one or more embodiments of the present disclosure. One or more Blocks and/or functions performed by network node 16 may be performed by one or more elements of network node 16 such as by CU-CP unit 32 in processing circuitry 68, processor 70, radio interface 62, etc. In one or more embodiments, network node 16 is configured to cause (Block S134), at the CU-CP 32, transmission of an indication indicating for the CU-UP 34 to ignore at least one packet data convergence protocol, PDCP, sequence number, SN, associated with a source network node, as described herein.

According to one or more embodiments, the processing circuitry 68 is further configured to receive, at the CU-CP 32, a handover request including inter-system handover information where the indication is based on the inter-system handover information. According to one or more embodiments, the indication is included in a bearer context setup message. According to one or more embodiments, the network node 16 is a high layer split architecture network node that splits the CU-UP 34 and the CU-CP 32 such that CU-UP 34 is logical and/or physical separate from CU-UP 34.

Figure 14:
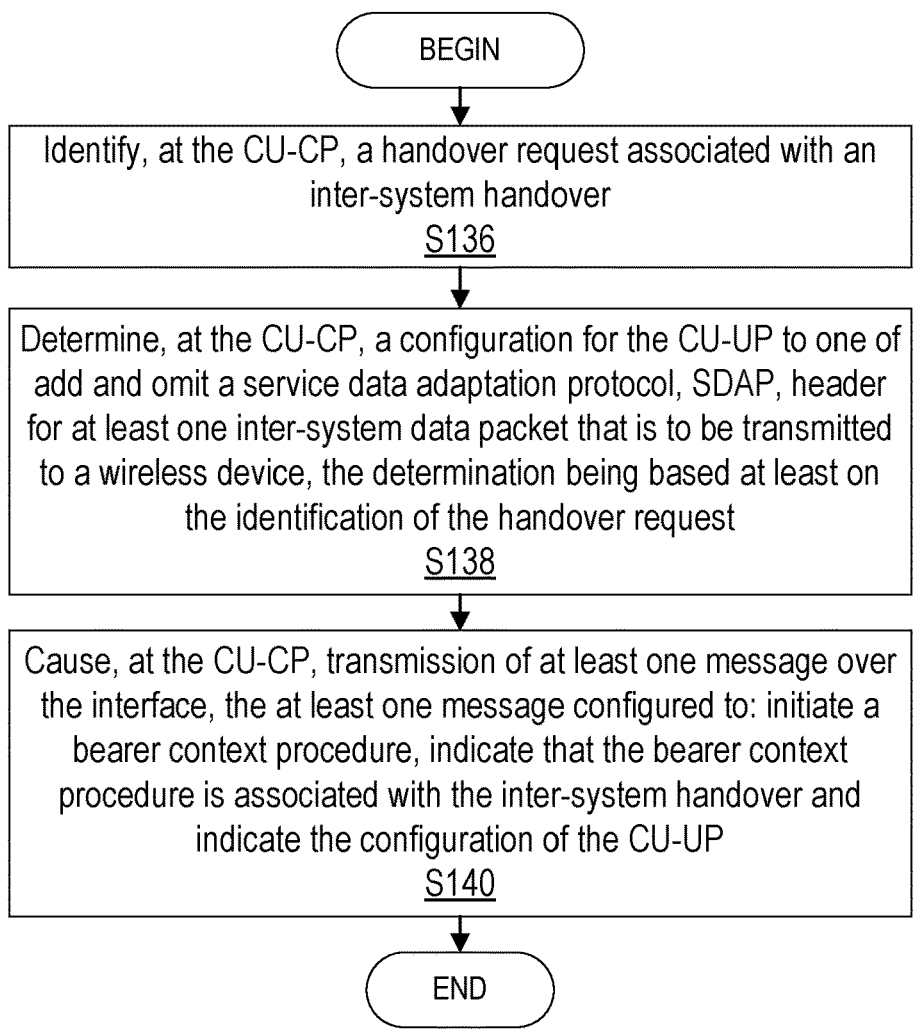
FIG. 14 is a flowchart of another example process in a network node according to some embodiments of the present disclosure.

FIG. 14 is a flowchart of another example process in a network node 16 according to one or more embodiments of the present disclosure. One or more Blocks and/or functions performed by network node 16 may be performed by one or more elements of network node 16 such as by CU-CP unit 32 (CU-CP 32) in processing circuitry 68, processor 70, radio interface 62, etc. In one or more embodiments, network node 16 is configured identify (Block S136), at the CU-CP 32, a handover request associated with an inter-system handover, as described herein. In one or more embodiments, network node 16 is configured determine (Block S138), at the CU-CP 32, a configuration for the CU-UP 34 to one of add and omit a service data adaptation protocol, SDAP, header for at least one inter-system data packet that is to be transmitted to a wireless device 22 where the determination is based at least on the identification of the handover request, as described herein. In one or more embodiments, network node 16 is configured cause (Block S140), at the CU-CP 32, transmission of at least one message over the interface, the at least one message configured to: initiate a bearer context procedure, indicate that the bearer context procedure is associated with the inter-system handover, and indicate the configuration of the CU-UP 34.

According to one or more embodiments, the processing circuitry 68 is further configured to determine, at the CU-CP 32, that the CU-UP 34 is not to transfer at least one packet data convergence protocol, PDCP, sequence number, SN, of at least one PDCP service data units, SDU, received from a source network node 16, to the wireless device 22. The configuring of the CU-UP 34 further includes configuring the CU-UP 34 to discard the at least one PDCP SN, received from the source network node 16, from the at least one PDCP SDU based at least on the determination. According to one or more embodiments, the network node 16 is a first radio access technology, RAT, network node 16 and the source network node 16 is a second RAT network node 16 where the first RAT is different from the second RAT. According to one or more embodiments, the processing circuitry 68 is further configured to receive, at the CU-CP 32, user plane tunnel information for inter-system handover where the user plane tunnel information is based on the at least one message.

According to one or more embodiments, the at least one message corresponds to one of a bearer context setup message and bearer context modification message. According to one or more embodiments, the network node 16 is a disaggregated network node 16 where the CU-CP 32 and CU-UP 34 are respective logical entities of the disaggregated network node 16. According to one or more embodiments, the processing circuitry 68 is further configured to receive, at the CU-CP 32, the handover request from an Access and Mobility management Function, AMF. According to one or more embodiments, the at least one message is associated with user plane tunnel endpoints required by the CU-CP 32.

Figure 15:
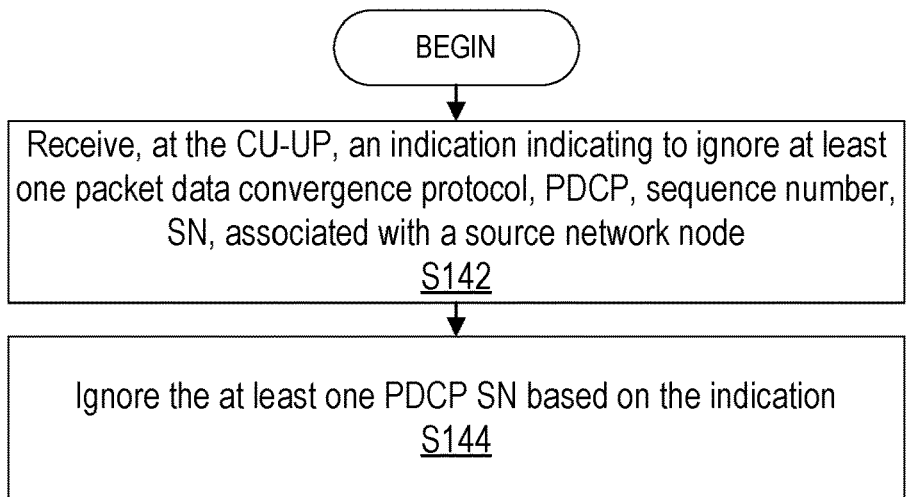
FIG. 15 is a flowchart of yet another example process in a network node according to some embodiments of the present disclosure.

FIG. 15 is a flowchart of another example process in the network node 16 according to one or more embodiments of the present disclosure. One or more Blocks and/or functions performed by network node 16 may be performed by one or more elements of network node 16 such as by CU-UP unit 34 in processing circuitry 68, processor 70, radio interface 62, etc. In one or more embodiments, network node 16 is configured to receive (Block S142), at the CU-UP 34, an indication indicating to ignore at least one packet data convergence protocol, PDCP, sequence number, SN, associated with a source network node 16, as described herein. In one or more embodiments, network node 16 is configured to ignore (Block S144) the at least one PDCP SN based on the indication, as described herein.

According to one or more embodiments, the indication is included in a bearer context setup message. According to one or more embodiments, the network node 16 is a high layer split architecture network node that splits the CU-UP 34 and the CU-CP 32.

Figure 16:
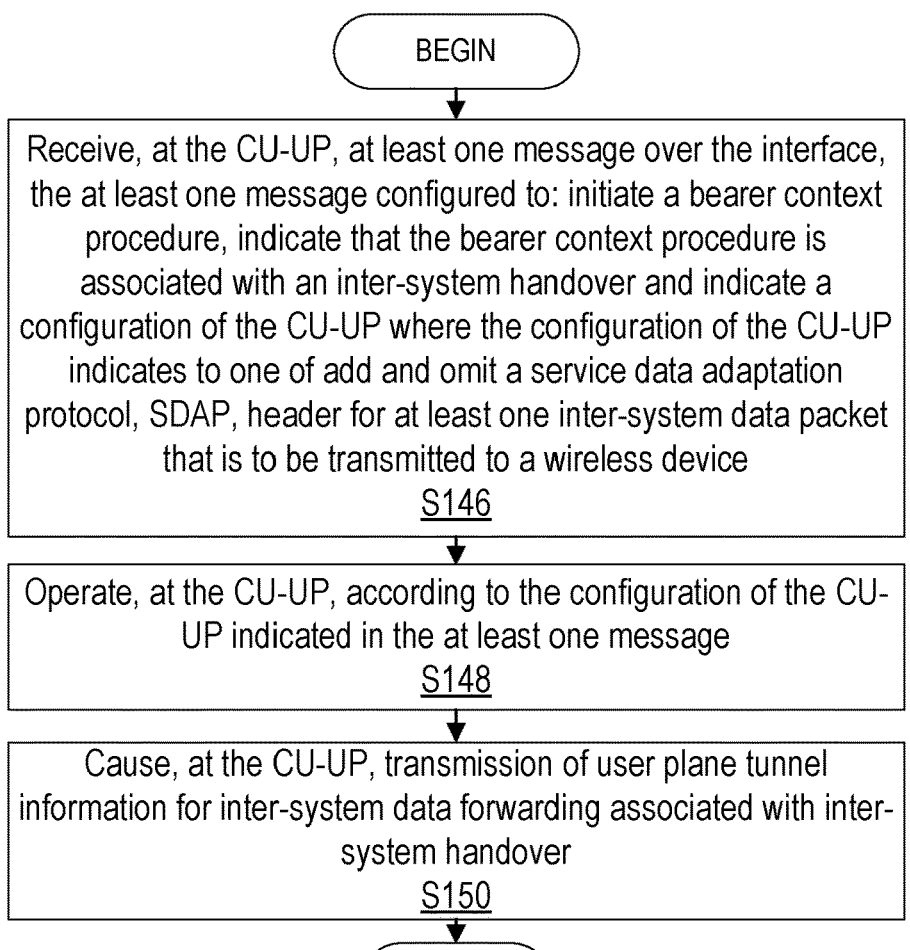
FIG. 16 is a flowchart of yet another example process in a network node according to some embodiments of the present disclosure.

FIG. 16 is a flowchart of another example process in the network node 16 according to one or more embodiments of the present disclosure. One or more Blocks and/or functions performed by network node 16 may be performed by one or more elements of network node 16 such as by CU-UP unit 34 (CU-UP 34) in processing circuitry 68, processor 70, radio interface 62, etc. In one or more embodiments, network node 16 is configured to receive (Block S146), at the CU-UP 34, at least one message over the interface, the at least one message configured to: initiate a bearer context procedure, indicate that the bearer context procedure is associated with an inter-system handover and indicate a configuration of the CU-UP 34 where the configuration of the CU-UP 34 indicates to one of add and omit a service data adaptation protocol, SDAP, header for at least one inter-system data packet that is to be transmitted to a wireless device 22, as described herein. The network node 16 is configured to operate (Block S148), at the CU-UP, according to the configuration of the CU-UP 34 indicated in the at least one message, as described herein. The network node 16 is configured to cause (Block S150), at the CU-UP 34, transmission of user plane tunnel information for inter-system data forwarding associated with inter-system handover, as described herein.

According to one or more embodiments, the processing circuitry 68 is further configured to select, at the CU-UP 34, the user plane tunnel information based on a handover type associated with the inter-system handover. According to one or more embodiments, the user plane tunnel information includes user plane tunnel endpoints required by the CU-CP 32. According to one or more embodiments, the configuration of the CU-UP 34 further indicates for the CU-UP 34 to discard at least one packet data convergence protocol, PDCP, sequence number, SN, of at least one PDCP service data units, SDU, received from a source network node 16, to the wireless device 22, as described herein. The operating, at the CU-|UP 34, including discarding the at least one PDCP SN, received from the source network node, from the at least one PDCP SDU based at least on the indicated configuration of the CU-UP 34.

According to one or more embodiments, the network node 16 is a first radio access technology, RAT, network node 16 and the source network node 16 is a second RAT network node 16 where the first RAT is different from the second RAT. According to one or more embodiments, the at least one message corresponds to one of a bearer context setup message and bearer context modification message. According to one or more embodiments, the network node 16 is a disaggregated network node 16 where the CU-CP 32 and CU-UP 34 are respective logical entities of the disaggregated network node 16.

Having generally described arrangements related to helping avoid misconfiguration for data forwarding associated with inter-system handover, details for these arrangements, functions and processes are provided as follows, and which may be implemented by the network node 16.

Some embodiments provide for helping avoid misconfiguration for data forwarding associated with inter-system handover such as, for example, by using an indication that indicates ignore at least one packet data convergence protocol, PDCP, sequence number, SN, associated with a source network node. While the discussion below refers to gNB-CU-CP 32 (CU-CP 32) and gNB-CU-UP 34 (i.e., CU-UP 34), one or more network node 16 (e.g., gNB) functions may be performed by one or more of processing circuitry 68, processor 70, CU-CP unit 32, CU-UP unit 34, radio interface 62, etc.

Equivalent functions may also be expected for RAN nodes that follow a similar high layer split architecture. For example, in case eNBs (e.g., one type of network node 16) split into CU/DU and CU-CP 32/CU-UP 34. Therefore, methods described below are equally applicable to NG-RAN nodes providing E-UTRA or to E-UTRAN nodes:

Methods for gNB-CU-CP 32 are applicable to CU-CP 32 part of an eNB in both E-UTRAN or NG-RAN. Methods for gNB-CU-UP 34 are applicable to CU-UP 34 part of an eNB in both E-UTRAN or NG-RAN. Methods for gNB-DU are applicable to DU part of an eNB in both E-UTRAN or NG-RAN.

Figure 17:
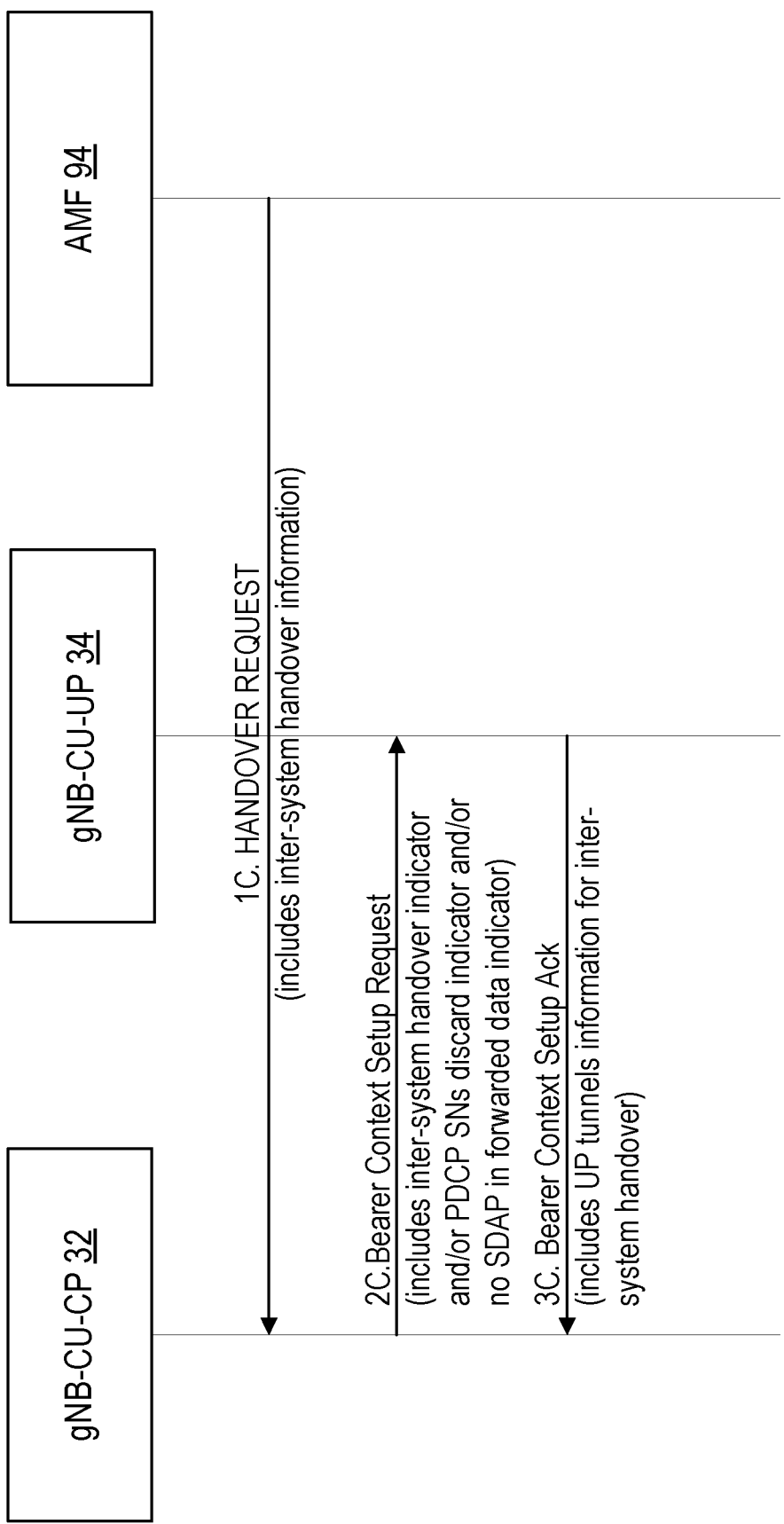
FIG. 17 is a signaling diagram according to some embodiments of the present disclosure.

One or more embodiments described herein relate to the Bearer Context establishment in the target gNB-CU-UP 34 for inter-system handover, and includes the steps described in FIG. 17 that is an example signaling diagram of bearer context establishment in the target gNB-CU-UP 34 for inter-system handover.

Upon the reception of a Handover Request from the Access and Mobility Management Function (AMF 94) (Step 1C), the target gNB-CU-CP 32 sends an indicator to the target gNB-CU-UP 34 requesting to ignore the PDCP SNs from the PDCP SDUs received from the source node and to be forwarded to wireless device 22 (Step 2C). The target gNB-CU-CP 32 receives a bearer context setup acknowledgement (ACK) that includes UP tunnels information for inter-system handover (Step 3C).

In one embodiment, this indicator is included in the PDU Session Resource To Setup List IE contained in the BEARER CONTEXT SETUP MESSAGE. An example of an implementation is shown below where the bolded and underlined text indicates a modification to the IE based on the teachings described herein.

9.3.3.2 PDU Session Resource to Setup List
 9.3.3.3 This IE contains PDU session resource related information used at Bearer Context Setup Request.

| IE/Group Name | Presence | Range | IE type and reference | Semantics description |
|---|---|---|---|---|
| PDU Session Resource To Setup Item | | 1 . . . <maxnoofPDUSessionResource> | | |
| >PDU Session ID | M | | 9.3.1.21 | |
| >PDU Session Type | M | | 9.3.1.22 | |
| >S-NSSAI | M | | 9.3.1.9 | |
| >Security Indication | M | | 9.3.1.23 | |
| >PDU Session Resource DL Aggregate Maximum Bit Rate | O | | Bit Rate 9.3.1.20 | This IE shall be present when at least one Non-GBR QoS Flows is being setup. |
| >NG UL UP Transport Layer Information | M | | UP Transport Layer Information 9.3.2.1 | |

-continued

| | | | | |
|---|---|---|---|---|
| >PDU Session Data Forwarding Information Request | O | | Data Forwarding Information Request 9.3.2.5 | |
| >PDU Session Inactivity Timer | O | | Inactivity Timer 9.3.1.54 | Included if the Activity Notification Level is set to PDU Session. |
| >Existing Allocated NG DL UP Transport Layer Information | O | | UP Transport Layer Information 9.3.2.1 | |
| >Network Instance | O | | 9.3.1.62 | This IE is ignored if the Common Network Instance IE is included. |
| >Common Network Instance | O | | 9.3.1.66 | |
| >DRB To Setup List | | 1 | | |
| >>DRB To Setup Item | | 1 ... \<maxnoofDRBs\> | | |
| >>>DRB ID | M | | 9.3.1.16 | |
| >>>SDAP Configuration | M | | 9.3.1.39 | |
| >>>PDCP Configuration | M | | 9.3.1.38 | |
| >>>Cell Group Information | M | | 9.3.1.11 | |
| >>>QoS Flows Information To Be Setup | M | | QoS Flow QoS Parameters List 9.3.1.25 | |
| >>>DRB Data forwarding information Request | O | | Data Forwarding Information Request 9.3.2.5 | Requesting forwarding info from the target gNB-CU-UP. |
| >>>DRB Inactivity Timer | O | | Inactivity Timer 9.3.1.54 | Included if the Activity Notification Level is set to DRB. |
| >>>PDCP SN Status Information | O | | 9.3.1.58 | Contains the PDCP SN Status at setup after Resume. |
| >>>DRB QoS | O | | 9.3.1.26 | Indicates the DRB QoS when more than one QoS Flow is mapped to the DRB. |
| >>>DAPS Request Information | O | | 9.3.1.91 | |
| >>>Ignore PDCP SNs | O | | 9.3.1.x | Indicates that the PDCP SNs of the PDCP SDUs received from the source node are to be ignored |
| >Redundant NG UL UP Transport Layer Information | O | | UP Transport Layer Information 9.3.2.1 | |
| >Redundant Common Network Instance | O | | Common Network Instance 9.3.1.66 | |

| | | | |
|---|---|---|---|
| >Redundant PDU Session Information | O | | 9.3.1.80 |

| Range bound | Explanation |
|---|---|
| maxnoofDRBs | Maximum no. of DRBs for a UE. Value is 32. |
| maxnoofPDUSessionResource | Maximum no. of PDU Sessions for a UE. Value is 256. |

Alternatively, this indicator is included in the BEARER CONTEXT MODIFICATION MESSAGE following a similar formulation as shown in the tabular above. In another alternative, this indicator is included in the DRB Data forwarding information Request IE contained in the PDU Session Resource To Setup List IE of the BEARER CONTEXT SETUP MESSAGE.

Upon the reception of the same Handover Request from the AMF, the target gNB-CU-CP 32 may also send an indicator informing that the procedure is associated to an inter-system data forwarding.

In one embodiment, this indicator is included in the BEARER CONTEXT SETUP MESSAGE. An example of this implementation is shown below where a modification to the message is indicated in bolded and underlined text.

Bearer Context Setup Request

This message is sent by the gNB-CU-CP 32 to request the gNB-CU-UP 34 to setup a bearer context.

Direction: gNB-CU-CP 32→gNB-CU-UP 34

| IE/Group Name | Presence | Range | IE type and reference | Semantics description |
|---|---|---|---|---|
| Message Type | M | | 9.3.1.1 | |
| gNB-CU-CP UE E1AP ID | M | | 9.3.1.4 | |
| Security Information | M | | 9.3.1.10 | |
| UE DL Aggregate Maximum Bit Rate | M | | Bit Rate 9.3.1.20 | |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. |
| Serving PLMN | M | | PLMN Identity 9.3.1.7 | |
| Activity Notification Level | M | | 9.3.1.67 | |
| UE Inactivity Timer | O | | Inactivity Timer 9.3.1.54 | Included if the Activity Notification Level is set to UE. |
| Bearer Context Status Change | O | | ENUMERATED (Suspend, Resume, . . . ) | Indicates the status of the Bearer Context |
| CHOICE System >E-UTRAN | M | | | |
| >>DRB To Setup List | M | | DRB To Setup List E-UTRAN 9.3.3.1 | |
| >>Subscriber Profile ID for RAT/Frequency priority | O | | 9.3.1.69 | |
| >>Additional RRM Policy Index | O | | 9.3.1.70 | |
| >NG-RAN | | | | |
| >>PDU Session Resource To Setup List | M | | 9.3.3.2 | |
| RAN UE ID | O | | OCTET STRING (SIZE(8)) | |
| gNB-DU ID | O | | 9.3.1.65 | Included whenever it is known by the gNB-CU-CP |
| Trace Activation | O | | 9.3.1.68 | |
| NPN Context Information | O | | 9.3.1.84 | |
| Management Based MDT PLMN List | O | | MDT PLMN List 9.3.1.89 | |
| CHO Initiation | O | | ENUMERATED (True, . . . ) | |
| Inter-system handover request | O | | ENUMERATED (Inter-system HO, . . . ) | Indicates that the procedure is associated to an inter-system handover |

Upon the reception of the same Handover Request from the AMF, the target gNB-CU-CP 32 may also send an indicator to the target gNB-CU-UP 34 requesting the creation of an SDAP header if not received from the source node.

In one embodiment, this indicator is included in the PDU Session Resource To Setup List IE contained in the BEARER CONTEXT SETUP MESSAGE. An example of this implementation is shown below where a modification to the list, based on the teachings of the present disclosure, is indicated in bolded and underlined text.

9.3.3.2. PDU Session Resource to Setup List

This IE contains PDU session resource related information used at Bearer Context Setup Request.

| IE/Group Name | Presence | Range | IE type and reference | Semantics description |
|---|---|---|---|---|
| PDU Session Resource To Setup Item | | 1 ... <maxnoofPDUSessionResource> | | |
| >PDU Session ID | M | | 9.3.1.21 | |
| >PDU Session Type | M | | 9.3.1.22 | |
| >S-NSSAI | M | | 9.3.1.9 | |
| >Security Indication | M | | 9.3.1.23 | |
| >PDU Session Resource DL Aggregate Maximum Bit Rate | O | | Bit Rate 9.3.1.20 | This IE shall be present when at least one Non-GBR QoS Flows is being setup. |
| >NG UL UP Transport Layer Information | M | | UP Transport Layer Information 9.3.2.1 | |
| >PDU Session Data Forwarding Information Request | O | | Data Forwarding Information Request 9.3.2.5 | |
| >PDU Session Inactivity Timer | O | | Inactivity Timer 9.3.1.54 | Included if the Activity Notification Level is set to PDU Session. |
| >Existing Allocated NG DL UP Transport Layer Information | O | | UP Transport Layer Information 9.3.2.1 | |
| >Network Instance | O | | 9.3.1.62 | This IE is ignored if the Common Network Instance IE is included. |
| >Common Network Instance | O | | 9.3.1.66 | |
| >DRB To Setup List | | 1 | | |
| >>DRB To Setup Item | | 1 ... <maxnoofDRBs> | | |
| >>>DRB ID | M | | 9.3.1.16 | |
| >>>SDAP Configuration | M | | 9.3.1.39 | |
| >>>PDCP Configuration | M | | 9.3.1.38 | |
| >>>Cell Group Information | M | | 9.3.1.11 | |
| >>>QoS Flows Information To Be Setup | M | | QoS Flow QoS Parameters List 9.3.1.25 | |
| >>>DRB Data forwarding information Request | O | | Data Forwarding Information Request 9.3.2.5 | Requesting forwarding info from the target gNB-CU-UP. |
| >>>DRB Inactivity Timer | O | | Inactivity Timer 9.3.1.54 | Included if the Activity Notification Level is set to DRB. |
| >>>PDCP SN Status Information | O | | 9.3.1.58 | Contains the PDCP SN Status at setup after Resume. |

| IE/Group Name | Presence | Range | IE type and reference | Semantics description |
|---|---|---|---|---|
| >>>DRB QoS | O | | 9.3.1.26 | Indicates the DRB QoS when more than one QoS Flow is mapped to the DRB. |
| >>>DAPS Request Information | O | | 9.3.1.91 | |
| >>>No SDAP header forwarded | O | | 9.3.1.x | Indicates that no SDAP header will be received form the source node |
| >Redundant NG UL UP Transport Layer Information | O | | UP Transport Layer Information 9.3.2.1 | |
| >Redundant Common Network Instance | O | | Common Network Instance 9.3.1.66 | |
| >Redundant PDU Session Information | O | | 9.3.1.80 | |

Alternatively, this indicator is included in the BEARER CONTEXT MODIFICATION MESSAGE following a similar formulation as shown in the tabular above.

In another alternative, this indicator is included in the DRB Data forwarding information Request IE contained in the PDU Session Resource To Setup List IE of the BEARER CONTEXT SETUP MESSAGE.

NOTE: Any combination of these three indicators (ignore PDCP SNs, inter-system handover and SDAP header) may be included in the same Bearer Context/Modification message, In yet another embodiment, the target gNB-CU-UP 34 is configured to select the User Plane tunnels information according to the handover type (i.e., inter-system handover) and its configuration. For example, if it supports both X2-U and Xn-U interfaces, the gNB-CU-UP 34 might be configured to send an X2-U User Plane information (i.e., X2-U IP address) when informed that the bearer context establishment is associated to an inter-system handover (i.e., such that the UP tunnel will end in a network node 16).

EXAMPLES

Example A1. A network node 16 including a central unit-control plane, CU-CP 32, that is configured to communicate with a central unit-user plane, CU-UP 34, the network node 16 configured to, and/or comprising a radio interface 62 and/or comprising processing circuitry 68 configured to:
cause, at the CU-CP 32, transmission of an indication indicating for the CU-UP 34 to ignore at least one packet data convergence protocol, PDCP, sequence number, SN, associated with a source network node 16.

Example A2. The network node 16 of Example A1, wherein the processing circuitry 68 is further configured to receive, at the CU-CP 32, a handover request including inter-system handover information, the indication being based on the inter-system handover information.

Example A3. The network node 16 of any of Examples A1 and A2, wherein the indication is included in a bearer context setup message.

Example A4. The network node 16 of any of Examples A1 to A3, wherein the network node 16 is a high layer split architecture network node that splits the CU-UP 34 and the CU-CP 32.

Example B1. A method implemented in a network node 16 including a central unit-control plane, CU-CP 32, that is configured to communicate with a central unit-user plane, CU-UP 34, the method comprising causing, at the CU-CP 32, transmission of an indication indicating for the CU-UP 34 to ignore at least one packet data convergence protocol, PDCP, sequence number, SN, associated with a source network node 16.

Example B2. The method of Example B1, further comprising receiving, at the CU-CP 32, a handover request including inter-system handover information, the indication being based on the inter-system handover information.

Example B3. The method of any one of Examples B1 and B2, wherein the indication is included in a bearer context setup message.

Example B4. The method of any one of Examples B1-B3, wherein the network node is a high layer split architecture network node that splits the CU-UP 34 and the CU-CP 32.

Example C1. A network node 16 including a central unit-user plane, CU-UP 34, that is configured to communicate with a central unit-control plane, CU-CP 32, the network node 16 configured to, and/or comprising a radio interface 62 and/or comprising processing circuitry 68 configured to:
receive, at the CU-UP 34, an indication indicating to ignore at least one packet data convergence protocol, PDCP, sequence number, SN, associated with a source network node 16; and
ignore the at least one PDCP SN based on the indication.

Example C2. The network node 16 of Example C1, wherein the indication is included in a bearer context setup message.

Example C3. The network node 16 of any one of Examples C1 and C2, wherein the network node 16 is a high layer split architecture network node that splits the CU-UP 34 and the CU-CP 32.

Example D1. A method implemented in a network node 16 including a central unit-user plane, CU-UP 34, that is configured to communicate with a central unit-control plane, CU-CP 32, the method comprising:
receiving, at the CU-UP 34, an indication indicating to ignore at least one packet data convergence protocol, PDCP, sequence number, SN, associated with a source network node 16; and
ignoring the at least one PDCP SN based on the indication.

Example D2. The method of Example D1, wherein the indication is included in a bearer context setup message.

Example D3. The method of any one of Examples D1 and D2, wherein the network node 16 is a high layer split architecture network node that splits the CU-UP 34 and the CU-CP 32.

Therefore, as described herein with respect to one or more embodiments, during inter-system handover with direct data forwarding, the PDCP layer is reset and the PDCP SNs of the forwarded PDCP SDUs should be discarded if received by the target node. In case the target gNB-CU is split into a gNB-CU-CP 32 entity and a gNB-CU-UP 34 entity with CP/UP separation, the target gNB-CU-UP 34 terminating the forwarding tunnels will be able to identify that the PDCP SNs are to be discarded.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node including a target central unit, CU, the target CU including a CU-control plane, CU-CP, and a CU-user plane, CU-UP, that are in communication with each other via at least one interface, the network node comprising:

processing circuitry configured to:
identify, at the CU-CP, a handover request associated with an inter-system handover;
determine, at the CU-CP, a configuration for the CU-UP to one of add and omit a service data adaptation protocol, SDAP, header for at least one inter-system data packet that is to be transmitted to a wireless device, the determination being based at least on the identification of the handover request;
cause, at the CU-CP, transmission of at least one message over the interface, the at least one message configured to:
initiate a bearer context procedure;
indicate that the bearer context procedure is associated with the inter-system handover; and
indicate the configuration of the CU-UP.

2. The network node of claim 1, wherein the processing circuitry is further configured to determine, at the CU-CP, that the CU-UP is not to transfer at least one packet data convergence protocol, PDCP, sequence number, SN, of at least one PDCP service data units, SDU, received from a source network node, to the wireless device; and
the configuring of the CU-UP further includes configuring the CU-UP to discard the at least one PDCP SN, received from the source network node, from the at least one PDCP SDU based at least on the determination.

3. The network node of claim 2, wherein the network node is a first radio access technology, RAT, network node and the source network node is a second RAT network node, the first RAT being different from the second RAT.

4. The network node of claim 1, wherein the processing circuitry is further configured to receive, at the CU-CP, user plane tunnel information for inter-system handover, the user plane tunnel information being based on the at least one message.

5. The network node of claim 1, wherein the at least one message corresponds to one of a bearer context setup message and bearer context modification message.

6. The network node of claim 1, wherein the network node is a disaggregated network node; and
the CU-CP and CU-UP being respective logical entities of the disaggregated network node.

7. The network node of claim 1, wherein the processing circuitry is further configured to receive, at the CU-CP, the handover request from an Access and Mobility management Function, AMF.

8. The network node of claim 1, wherein the at least one message is associated with user plane tunnel endpoints required by the CU-CP.

9. A method implemented by a network node that includes a target central unit, CU, the target CU including a CU-control plane, CU-CP, and a CU-user plane, CU-UP, that are in communication with each other via at least one interface, the method comprising:
identifying, at the CU-CP, a handover request associated with an inter-system handover;
determining, at the CU-CP, a configuration for the CU-UP to one of add and omit a service data adaptation protocol, SDAP, header for at least one inter-system data packet that is to be transmitted to a wireless device, the determination being based at least on the identification of the handover request;
causing, at the CU-CP, transmission of at least one message over the interface, the at least one message configured to:
initiate a bearer context procedure;
indicate that the bearer context procedure is associated with the inter-system handover; and
indicate the configuration of the CU-UP.

10. The method of claim 9, further comprising determining, at the CU-CP, that the CU-UP is not to transfer at least one packet data convergence protocol, PDCP, sequence number, SN, of at least one PDCP service data units, SDU, received from a source network node, to the wireless device; and
the configuring of the CU-UP further includes configuring the CU-UP to discard the at least one PDCP SN, received from the source network node, from the at least one PDCP SDU based at least on the determination.

11. The method of claim 10, wherein the network node is a first radio access technology, RAT, network node and the source network node is a second RAT network node, the first RAT being different from the second RAT.

12. The method of claim 9, further comprising receiving, at the CU-CP, user plane tunnel information for inter-system handover, the user plane tunnel information being based on the at least one message.

13. The method of claim 9, wherein the at least one message corresponds to one of a bearer context setup message and bearer context modification message.

14. The method of claim 9, wherein the network node is a disaggregated network node; and
the CU-CP and CU-UP being respective logical entities of the disaggregated network node.

15. The method of claim 9, further comprising receiving, at the CU-CP, the handover request from an Access and Mobility management Function, AMF.

16. The method of claim 9, wherein the at least one message is associated with user plane tunnel endpoints required by the CU-CP.

17. A network node including a target central unit, CU, the target CU including a CU-control plane, CU-CP, and a CU-user plane, CU-UP, that are in communication with each other via at least one interface, the network node comprising:
processing circuitry configured to:
receive, at the CU-UP, at least one message over the interface, the at least one message configured to:
initiate a bearer context procedure;
indicate that the bearer context procedure is associated with an inter-system handover; and
indicate a configuration of the CU-UP, the configuration of the CU-UP indicating to one of add and omit a service data adaptation protocol, SDAP, header for at least one inter-system data packet that is to be transmitted to a wireless device;
operate, at the CU-UP, according to the configuration of the CU-UP indicated in the at least one message;
cause, at the CU-UP, transmission of user plane tunnel information for inter-system data forwarding associated with inter-system handover.

18. The network node of claim 17, wherein the processing circuitry is further configured to select, at the CU-UP, the user plane tunnel information based on a handover type associated with the inter-system handover.

19. The network node of claim 18, wherein the user plane tunnel information includes user plane tunnel endpoints required by the CU-CP.

20. The network node of claim 17, wherein the configuration of the CU-UP further indicates for the CU-UP to discard at least one packet data convergence protocol, PDCP, sequence number, SN, of at least one PDCP service data units, SDU, received from a source network node, to the wireless device; and the operating, at the CU-|UP, including discarding the at least one PDCP SN, received from the source network node, from the at least one PDCP SDU based at least on the indicated configuration of the CU-UP.

21. The network node of claim 20, wherein the network node is a first radio access technology, RAT, network node and the source network node is a second RAT network node, the first RAT being different from the second RAT.

22. The network node of claim 17, wherein the at least one message corresponds to one of a bearer context setup message and bearer context modification message.

23. The network node of claim 17, wherein the network node is a disaggregated network node; and the CU-CP and CU-UP being respective logical entities of the disaggregated network node.

24. A method implemented by a network node including a target central unit, CU, the target CU including a CU-control plane, CU-CP, and a CU-user plane, CU-UP, that are in communication with each other via at least one interface, the method comprising:

receiving, at the CU-UP, at least one message over the interface, the at least one message configured to:
 initiate a bearer context procedure;
 indicate that the bearer context procedure is associated with an inter-system handover; and
 indicate a configuration of the CU-UP, the configuration of the CU-UP indicating to one of add and omit a service data adaptation protocol, SDAP, header for at least one inter-system data packet that is to be transmitted to a wireless device;

operating, at the CU-UP, according to the configuration of the CU-UP indicated in the at least one message;

causing, at the CU-UP, transmission of user plane tunnel information for inter-system data forwarding associated with inter-system handover.

25. The method of claim 24, further comprising selecting, at the CU-UP, the user plane tunnel information based on a handover type associated with the inter-system handover.

26. The method of claim 25, wherein the user plane tunnel information includes user plane tunnel endpoints required by the CU-CP.

27. The method of claim 24, wherein the configuration of the CU-UP further indicates for the CU-UP to discard at least one packet data convergence protocol, PDCP, sequence number, SN, of at least one PDCP service data units, SDU, received from a source network node, to the wireless device; and the operating, at the CU-|UP, including discarding the at least one PDCP SN, received from the source network node, from the at least one PDCP SDU based at least on the indicated configuration of the CU-UP.

28. The method of claim 27, wherein the network node is a first radio access technology, RAT, network node and the source network node is a second RAT network node, the first RAT being different from the second RAT.

29. The method of claim 24, wherein the at least one message corresponds to one of a bearer context setup message and bearer context modification message.

30. The method of claim 24, wherein the network node is a disaggregated network node; and the CU-CP and CU-UP being respective logical entities of the disaggregated network node.

* * * * *